US012746605B2

(12) United States Patent
Kuriya et al.

(10) Patent No.: US 12,746,605 B2
(45) Date of Patent: Sep. 29, 2026

(54) TOOL CLAMP DEVICE AND MACHINE TOOL

(71) Applicant: DMG MORI CO., LTD., Nara (JP)

(72) Inventors: Tatsuhiko Kuriya, Nara (JP); Isao Hikita, Nara (JP); Kenichi Mizukoshi, Nara (JP)

(73) Assignee: DMG MORI CO., LTD., Nara (JP)

( * ) Notice: Subject to any disclaimer, the term of this patent is extended or adjusted under 35 U.S.C. 154(b) by 1024 days.

(21) Appl. No.: 17/766,401

(22) PCT Filed: Oct. 30, 2020

(86) PCT No.: PCT/JP2020/040828
§ 371 (c)(1),
(2) Date: Apr. 4, 2022

(87) PCT Pub. No.: WO2021/085607
PCT Pub. Date: May 6, 2021

(65) Prior Publication Data
US 2024/0051037 A1 Feb. 15, 2024

(30) Foreign Application Priority Data
Nov. 1, 2019 (JP) ................................ 2019 200015

(51) Int. Cl.
*B23B 31/26* (2006.01)
*B23B 31/30* (2006.01)

(52) U.S. Cl.
CPC ............ *B23B 31/265* (2013.01); *B23B 31/30* (2013.01); *B23B 2260/096* (2013.01)

(58) Field of Classification Search
CPC ..... B23B 29/326; B23B 31/265; B23B 31/30; B23B 2260/096; Y10T 409/309464
See application file for complete search history.

(56) References Cited

U.S. PATENT DOCUMENTS 5,707,186 A * 1/1998 Gobell .................. B23B 31/302 285/94
6,619,670 B2 * 9/2003 Alberici ............... B23Q 1/0036 409/233
(Continued)

FOREIGN PATENT DOCUMENTS

EP 03560640 A1 10/2019
JP S58-149151 A 9/1983
(Continued)

*Primary Examiner* — Sunil K Singh
(74) *Attorney, Agent, or Firm* — IP Business Solutions, LLC.

(57) ABSTRACT

A cutting tool rest (31) includes a clamping mechanism part (131) and a first piston (61). First piston (61) includes a first facing section (63) and a second facing section (64), and clamping mechanism part (131) includes a lever (135). First piston (61) reciprocates between a first position at which lever (135) and first facing section (63) are in contact with each other to operate clamping mechanism part (131) in a clamped state and a second position at which lever (135) and second facing section (64) are in contact with each other to operate clamping mechanism part (131) in an unclamped state. Cutting tool rest (31) includes a second piston (71) that moves first piston (61) to a third position between the first position and the second position. When first piston (61) is located at the third position, lever (135) is separated from first facing section (63) and second facing section (64).

6 Claims, 16 Drawing Sheets

(56) References Cited

U.S. PATENT DOCUMENTS

| | | | |
|---|---|---|---|
| 2005/0262976 A1 | 12/2005 | Shibui | |
| 2008/0224423 A1* | 9/2008 | Hangleiter | B23B 31/265<br>279/75 |
| 2015/0367473 A1 | 12/2015 | Meidar et al. | |
| 2019/0217396 A1 | 7/2019 | Sugiura | |

FOREIGN PATENT DOCUMENTS

| | | |
|---|---|---|
| JP | H04-002728 Y | 1/1992 |
| JP | H07-015208 U | 3/1995 |
| JP | 2004-074360 A | 3/2004 |
| JP | 2019-123063 A | 7/2019 |

* cited by examiner

TOOL CLAMP DEVICE AND MACHINE TOOL

TECHNICAL FIELD

The present invention relates to a tool clamp device and a machine tool.

BACKGROUND ART

For example, Japanese Patent Laying-Open No. S58-149151 (PTL 1) discloses a turret cutting tool rest. The turret cutting tool rest is provided with a tool holder-mounting part, an unclamping cylinder mechanism, and a clamping cylinder mechanism such that a tool for a machining center can be mounted as a tool for a lathe.

CITATION LIST

Patent Literature

PTL 1: Japanese Patent Laying-Open No. S58-149151

SUMMARY OF INVENTION

Technical Problem

As disclosed in PTL 1, a tool clamp device having a function of clamping a tool, such as a cutting tool rest or a tool spindle, is known. As a structure of the tool clamp device, there is a tool clamp device including a clamping mechanism part capable of clamping a tool and a piston that causes the clamping mechanism part to perform a clamping operation and an unclamping operation. In an attempt to rotate the tool clamped in this tool clamp device, depending on the structure of the clamping mechanism part, there may be a problem in contact between the stopped piston and the rotating clamping mechanism part that rotates with the tool.

Therefore, an object of the present invention is to solve the above problem, and to provide a tool clamp device capable of rotating a clamped tool and a machine tool including such a tool clamp device.

Solution to Problem

A tool clamp device according to the present invention is a tool clamp device on which a rotating tool is detachably mounted. The tool clamp device includes a clamping mechanism part and a first piston that reciprocates in an axial direction of a predetermined axis about the predetermined axis. The clamping mechanism part includes one of a first facing section and a second facing section facing each other in the axial direction of the predetermined axis, and a locking part disposed between the first facing section and the second facing section. The first piston includes the other of a first facing section and a second facing section, and the locking part. The first piston reciprocates between a first position at which the locking part and the first facing section are in contact with each other to operate the clamping mechanism part in a clamped state of clamping a rotating tool and a second position at which the locking part and the second facing section are in contact with each other to operate the clamping mechanism part in an unclamped state of unclamping the rotating tool. The tool clamp device further includes a second piston that moves the first piston to a third position located between the first position and the second position in the axial direction of the predetermined axis. When the first piston is positioned at the third position, the clamping mechanism part is held in the clamped state, and the locking part is separated from the first facing section and the second facing section.

The clamping mechanism part preferably has a lever extending outward in a radial direction of the predetermined axis and corresponding to the locking part. The first piston is provided with a recess recessed outward in the radial direction of the predetermined axis. The lever is disposed in the recess. The first piston has a first wall surface and a second wall surface that constitute a wall surface of the recess and correspond to the first facing section and the second facing section, respectively.

The tool clamp device preferably further includes a cylinder to which the first piston and the second piston are fitted, the cylinder defining a first hydraulic chamber to which hydraulic pressure is supplied when the first piston is moved to the first position and a second hydraulic chamber to which hydraulic pressure is supplied when the first piston is moved to the second position. The first piston and the second piston define a third hydraulic chamber to which hydraulic pressure is supplied to move the first piston to the third position. The third hydraulic chamber is provided inside in the radial direction of the predetermined axis with respect to the first hydraulic chamber and the second hydraulic chamber.

The tool clamp device preferably further includes a locking member that is provided on the first piston and holds the first piston at the third position by being locked to the second piston when hydraulic pressure is supplied to the third hydraulic chamber.

When the hydraulic pressure is supplied to the second hydraulic chamber, the second piston preferably moves integrally with the first piston by the locking member being locked to the second piston.

A machine tool according to the present invention includes the tool clamp device according to any of the above descriptions and an automatic tool changer that changes a rotating tool mounted on the tool clamp device.

Advantageous Effects of Invention

The present invention can provide a tool clamp device capable of rotating a clamped tool, and a machine tool including such a tool clamp device.

DESCRIPTION OF EMBODIMENTS

Figure 1:
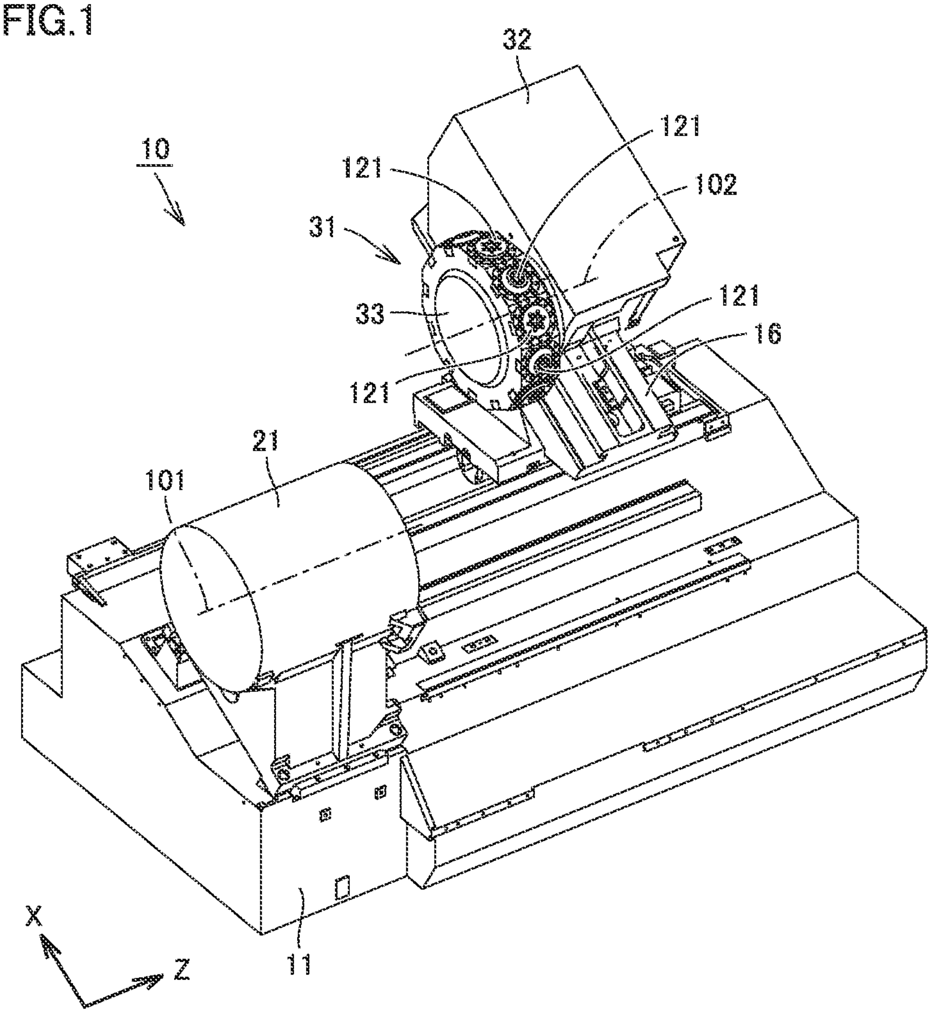
FIG. 1 is a perspective view of a machine tool according to an embodiment of the present invention.

An embodiment of the present invention will be described with reference to the drawings. In the drawings referred to below, the same or corresponding members are denoted by the same reference signs.

FIG. 1 is a perspective view of a machine tool according to the embodiment of the present invention. FIG. 1 shows an internal structure of the machine tool seen through a cover having an appearance of the machine tool.

Referring to FIG. 1, a machine tool 10 according to the present embodiment is a lathe that performs workpiece machining by bringing a tool into contact with a rotating workpiece. Machine tool 10 has a milling function of performing workpiece machining by bringing a rotating tool into contact with a stopped workpiece.

Machine tool 10 is a numerically controlled (NC) machine tool in which various operations for workpiece machining are automated by numerical control by a computer.

First, an overall structure of machine tool 10 will be described. Machine tool 10 includes a bed 11, a headstock 21, a cutting tool rest 31, and an automatic tool changer 18 (see FIG. 2 described later).

Bed 11 is a base member for supporting headstock 21, cutting tool rest 31, automatic tool changer 18, and the like, and is installed on a floor of a factory or the like. Bed 11 is made of metal such as cast iron.

Headstock 21 is attached to bed 11. Headstock 21 includes a spindle (not illustrated). The spindle is rotationally driven about a central axis 101 parallel to a Z-axis extending in a horizontal direction. A chuck mechanism capable of detachably holding a workpiece is provided at a tip of the spindle. The workpiece held by the chuck mechanism rotates about central axis 101 as the spindle is rotationally driven.

Cutting tool rest 31 is provided in a machining area defined by the cover (not illustrated). Cutting tool rest 31 is a turret cutting tool rest, and is pivotable about a central axis (pivot central axis) 102 parallel to the Z-axis.

Cutting tool rest 31 includes a cutting tool rest base 32, a turret 33, and a plurality of tool holders 121. A motor or the like for pivotably driving cutting tool rest 31 is mounted on cutting tool rest base 32. Cutting tool rest base 32 is attached to a horizontal feeding table described later.

Turret 33 is provided so as to protrude from cutting tool rest base 32 in a direction approaching headstock 21 in a Z-axis direction. Turret 33 has a disk shape in which an axial direction of pivot central axis 102 is a thickness direction. Turret 33 is pivotable about pivot central axis 102.

The plurality of tool holders 121 are mounted on turret 33. The plurality of tool holders 121 are fastened to turret 33 with a bolt. The plurality of tool holders 121 are provided side by side in a circumferential direction of pivot central axis 102. Each tool holder 121 is configured to hold a tool.

Cutting tool rest 31 is attached to bed 11 with a saddle 16 and a horizontal feeding table (not illustrated) interposed therebetween. Saddle 16 is movable in the Z-axis direction by various feed mechanisms, guide mechanisms, servomotors, and the like. The horizontal feeding table is movable in an X-axis direction orthogonal to the Z-axis and inclined with respect to a vertical direction by various feeding mechanisms, guide mechanisms, servomotors, and the like. By moving saddle 16 and the horizontal feeding table in the Z-axis direction and the X-axis direction, respectively, a machining position of a workpiece in the tool held by tool holder 121 can be moved in a plane defined by the Z-axis and the X-axis.

Figure 2:
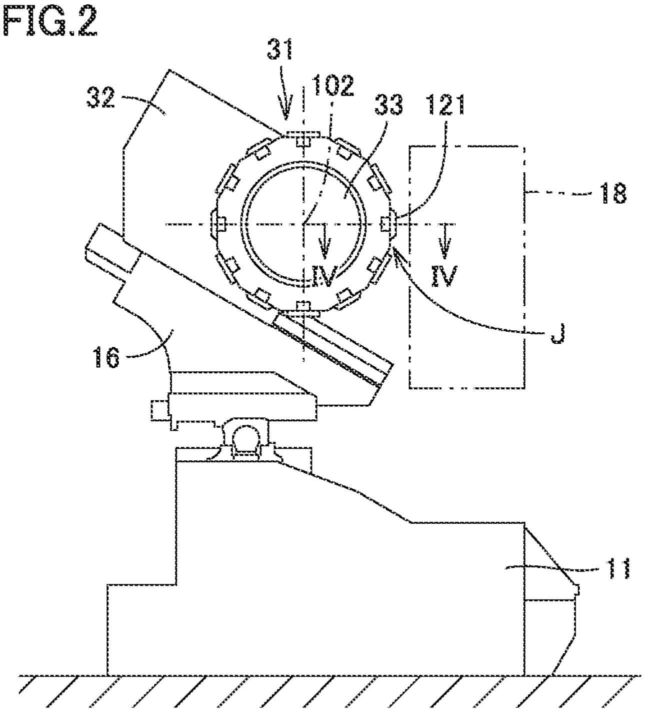
FIG. 2 is a side view of an automatic tool change position in a cutting tool rest.
Figure 3:
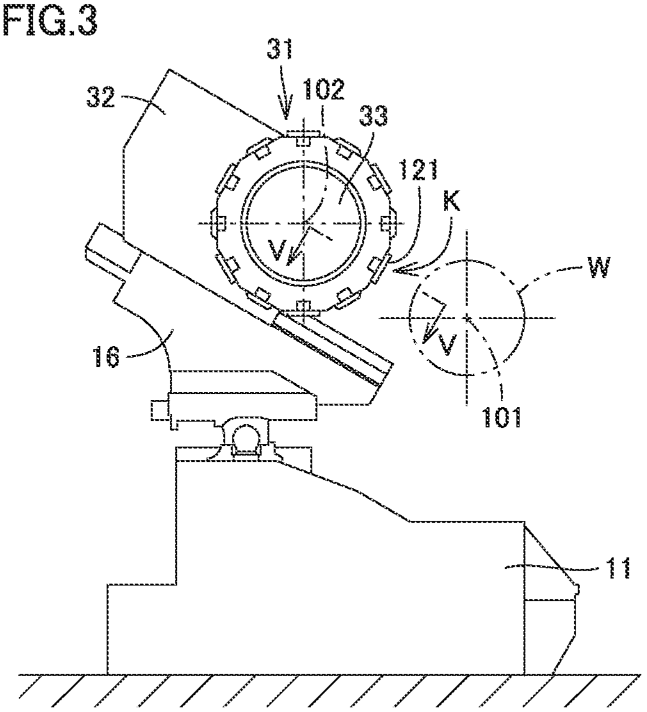
FIG. 3 is a side view of a workpiece machining position of a tool in the cutting tool rest.

FIG. 2 is a side view of an automatic tool change position in the cutting tool rest. FIG. 3 is a side view of a workpiece machining position of a tool in the cutting tool rest.

Referring to FIGS. 1 to 3, turret 33 pivots about pivot central axis 102, and then the tool held by tool holder 121 moves in the circumferential direction of pivot central axis 102. Automatic tool changer (ATC) 18 has a double arm or the like capable of holding a tool, and is configured to change the tool between cutting tool rest 31 in the machining area and a tool magazine (not illustrated) outside the machining area.

As illustrated in FIG. 2, automatic tool changer 18 is provided in front of cutting tool rest 31. When the tool on cutting tool rest 31 is changed by automatic tool changer 18, tool holder 121 holding the tool to be changed is positioned at an automatic tool change position J in the drawing. As illustrated in FIG. 3, when a workpiece W is machined by the tool in cutting tool rest 31, tool holder 121 holding the tool used for machining is positioned at a workpiece machining position K in the drawing.

The positions of automatic tool change position J and workpiece machining position K are not limited. For example, when automatic tool changer 18 is provided behind the machine tool, automatic tool change position J may be a position shifted by 180° from workpiece machining position K shown in FIG. 3.

Figure 4:
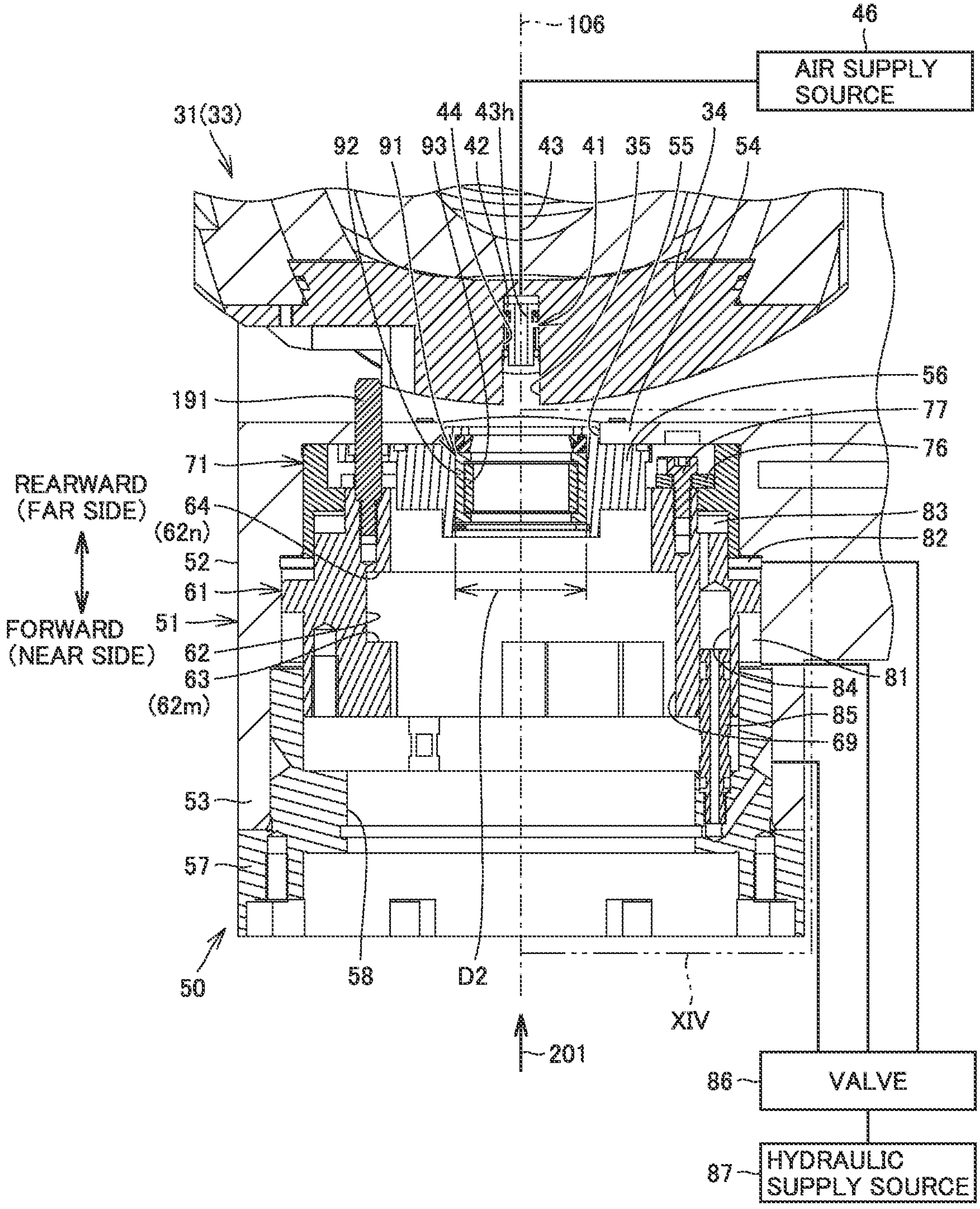
FIG. 4 is a sectional view of the cutting tool rest.
Figure 5:
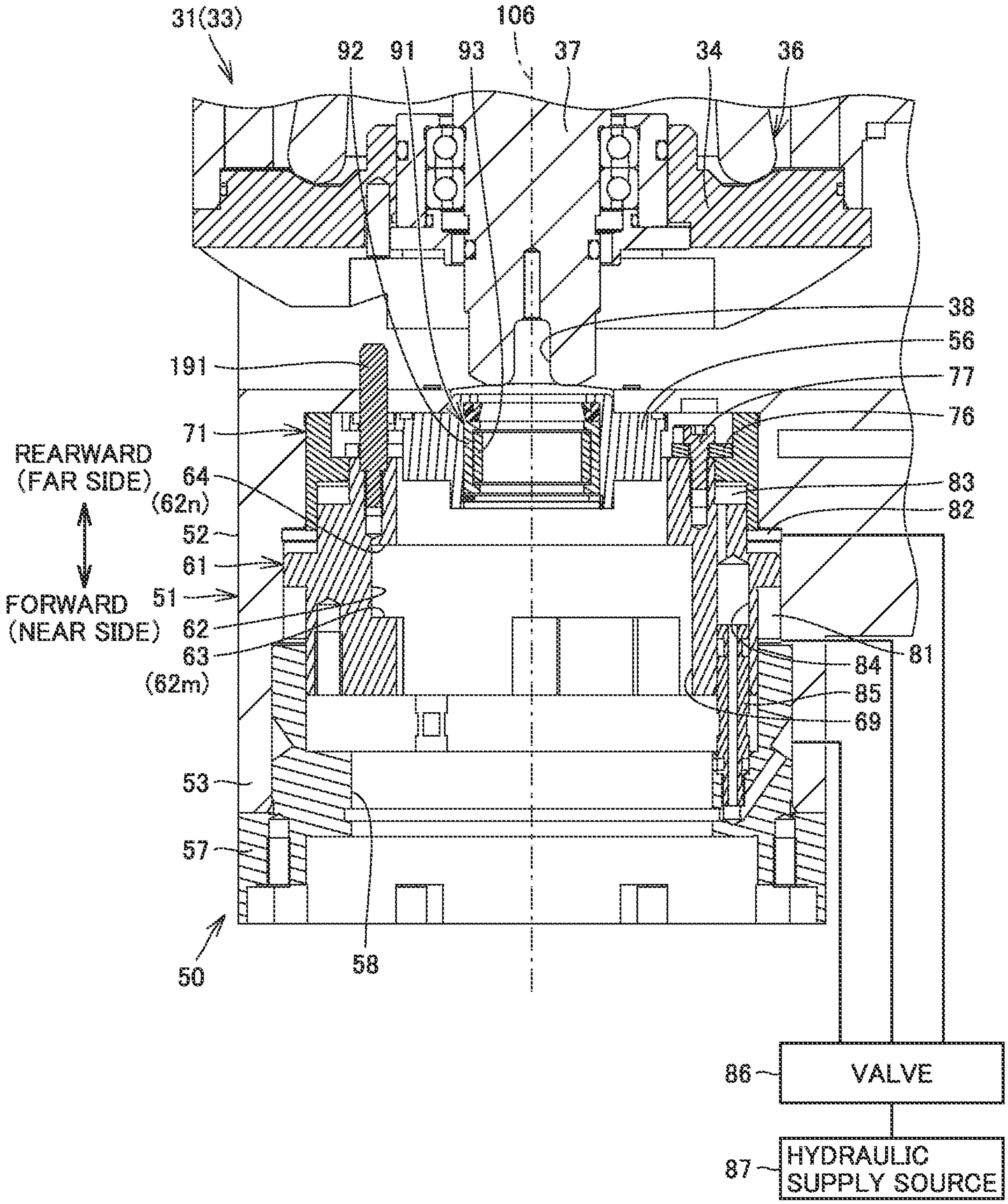
FIG. 5 is another sectional view of the cutting tool rest.

Next, a structure of turret 33 of cutting tool rest 31 will be described. FIGS. 4 and 5 are sectional views of the cutting tool rest. FIGS. 4 and 5 show cutting tool rest 31 from which tool holder 121 has been removed. The cross section shown in FIG. 4 corresponds to the cross section of cutting tool rest 31 at automatic tool change position J as viewed in a direction of an arrow on a line IV-IV in FIG. 2. The cross section shown in FIG. 5 corresponds to the cross section of cutting tool rest 31 at workpiece machining position K as viewed in a direction of an arrow on a line V-V in FIG. 3.

Referring to FIGS. 4 and 5, cutting tool rest 31 (turret 33) further includes a ring member 34. Ring member 34 has a ring shape centered on pivot central axis 102. Ring member 34 is provided with a circumferential groove 35. Circumferential groove 35 has a groove shape that is recessed inward in a radial direction of pivot central axis 102 and circles around pivot central axis 102.

Cutting tool rest 31 further includes an air supply part 41. Air supply part 41 is provided at a sectional position of cutting tool rest 31 at automatic tool change position J shown in FIG. 4. Air supply part 41 is provided with a first air flow path 43. Air from an air supply source 46 is supplied to first air flow path 43.

Ring member 34 is further provided with a nozzle insertion hole 44. Nozzle insertion hole 44 is a bottomed hole recessed from a groove bottom of circumferential groove 35 inward in the radial direction of pivot central axis 102. Air supply part 41 includes an air nozzle 42. Air nozzle 42 is provided with a through-hole 43*h*. Through-hole 43*h* constitutes a discharge port of air from first air flow path 43.

Cutting tool rest 31 further includes a motor 36. Motor 36 is provided at a sectional position of cutting tool rest 31 at workpiece machining position K shown in FIG. 5. Motor 36 is built in turret 33.

Motor 36 includes a rotor shaft 37. Rotor shaft 37 extends axially along a central axis 106 extending in the radial direction of pivot central axis 102. Rotor shaft 37 is supported so as to be rotatable about central axis 106. An engagement groove 38 is provided at a tip of rotor shaft 37. Engagement groove 38 has a groove shape that is recessed from an end surface of the tip of rotor shaft 37 and extends in one direction. Engagement groove 38 is provided continuously with circumferential groove 35 in the circumferential direction of pivot central axis 102.

As will be described in detail later, air supply part 41 performs air purge at a time of automatic change of a tool mounted on cutting tool rest 31. When a rotating tool is mounted on cutting tool rest 31, motor 36 outputs rotation to the rotating tool.

Figure 6:
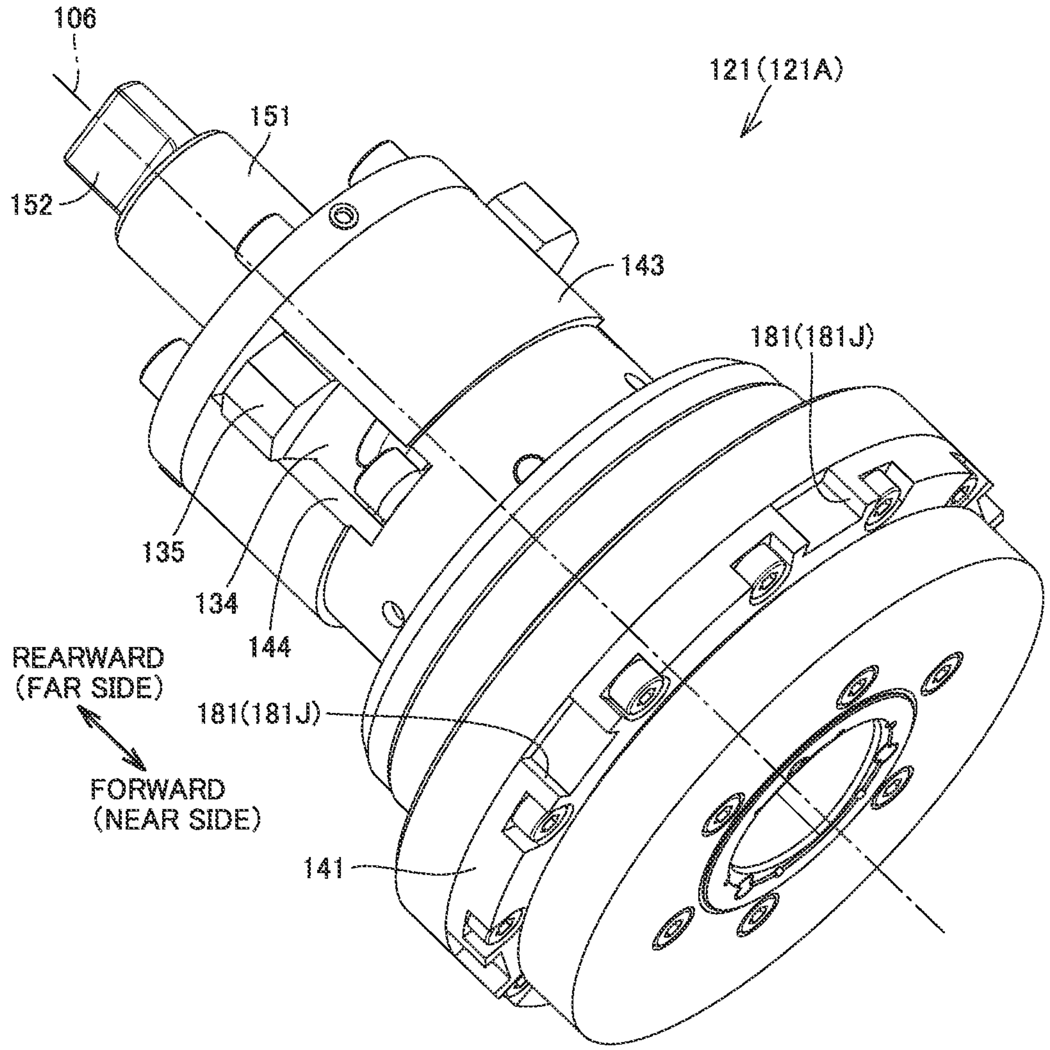
FIG. 6 is a perspective view of a first tool holder for a rotating tool.
Figure 7:
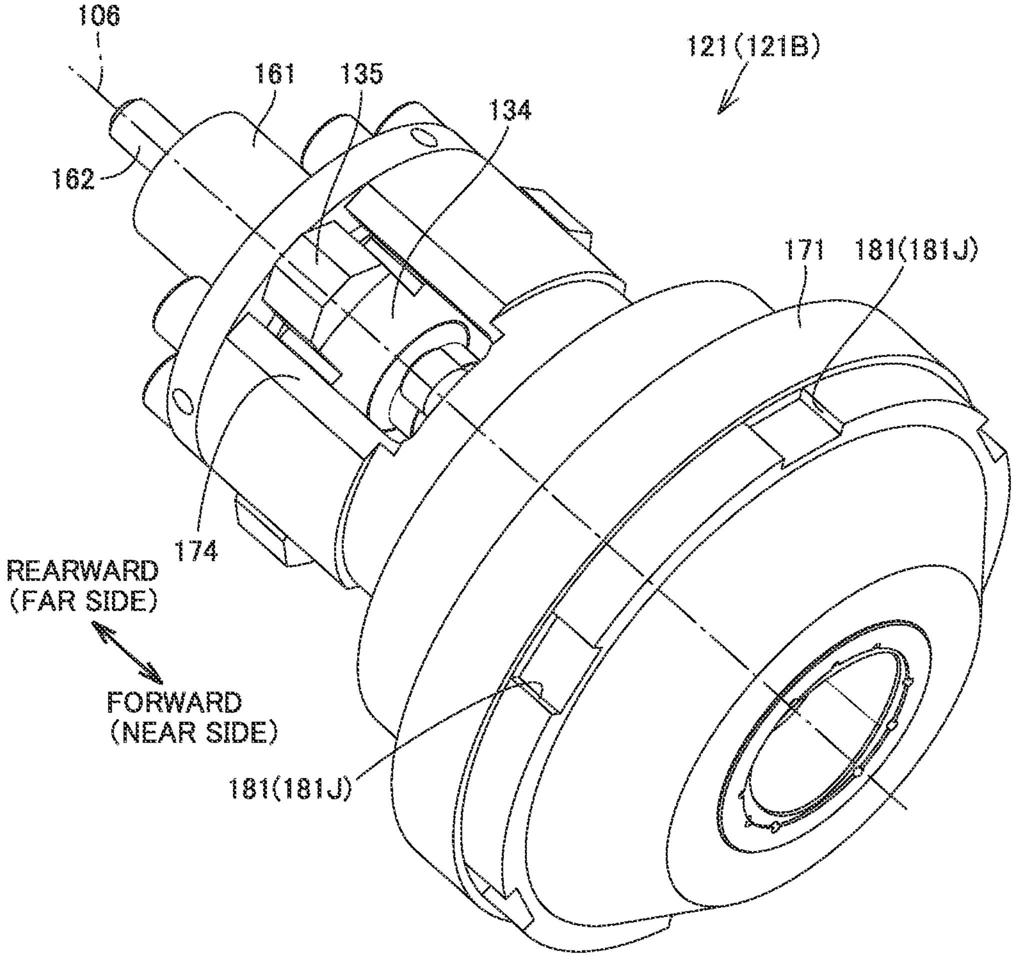
FIG. 7 is a perspective view of a second tool holder for a fixed tool.
Figure 8:
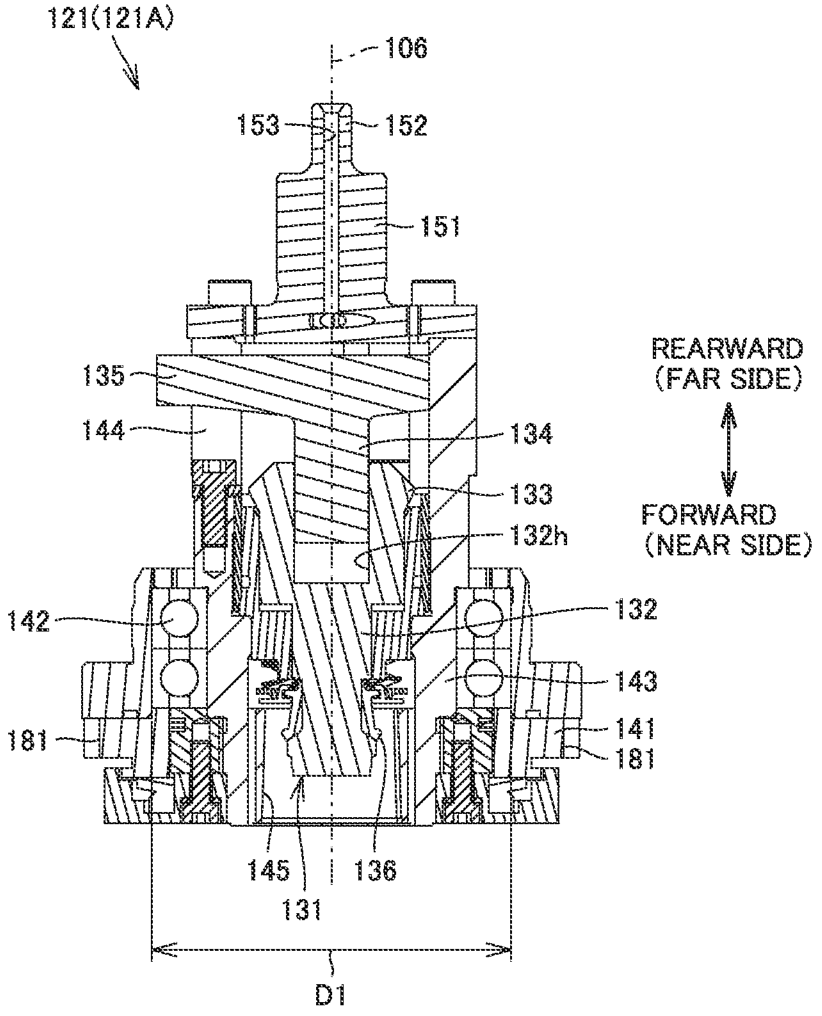
FIG. 8 is a sectional view of the first tool holder shown in FIG. 6.
Figure 9:
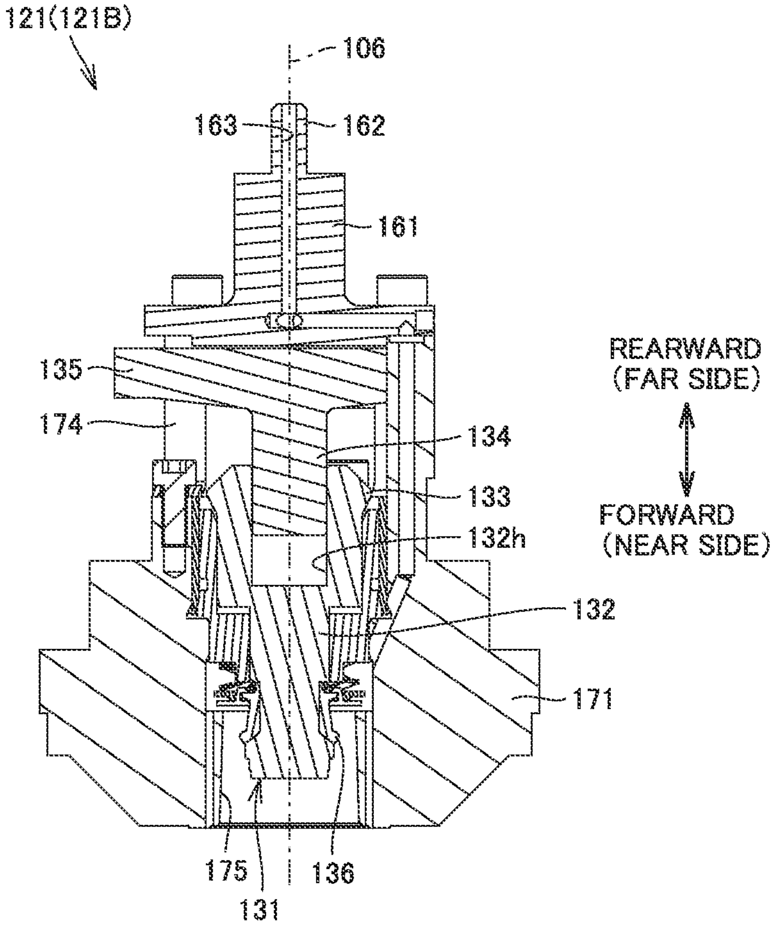
FIG. 9 is a sectional view of the second tool holder shown in FIG. 7.

Next, a structure of tool holder 121 will be described. FIG. 6 is a perspective view of a first tool holder for a rotating tool. FIG. 7 is a perspective view of a second tool holder for a fixed tool. FIG. 8 is a sectional view of the first tool holder shown in FIG. 6. FIG. 9 is a sectional view of the second tool holder shown in FIG. 7.

Tool holder 121 is mounted on cutting tool rest 31 by being inserted into holder insertion hole 58 of cutting tool rest 31 from a direction indicated by an arrow 201 in FIG. 4. Central axis 106 illustrated in FIGS. 6 to 9 coincides with central axis 106 illustrated in FIGS. 4 and 5 when tool holder 121 is mounted on cutting tool rest 31.

In the following description, a far side direction in an insertion direction of tool holder 121 into holder insertion hole 58 is also referred to as "rearward in an axial direction of central axis 106", and a near side direction in the insertion direction of tool holder 121 into holder insertion hole 58 is also referred to as "forward in the axial direction of central axis 106".

Referring to FIGS. 6 to 9, cutting tool rest 31 includes a first tool holder 121A and a second tool holder 121B as tool holder 121. First tool holder 121A is a tool holder that holds a rotating tool. Second tool holder 121B is a tool holder that holds a fixed tool.

The rotating tool is a tool that machines a workpiece while rotating, and is a drill, an end mill, a reamer, or the like. The fixed tool is a tool for machining a rotating workpiece, and is an outer diameter cutting tool, an inner diameter cutting tool, an end surface cutting tool, a cutoff tool, or the like.

Each of first tool holder 121A and second tool holder 121B includes a clamping mechanism part 131. Clamping mechanism part 131 is configured to clamp a tool.

Clamping mechanism part 131 includes a drawbar 132, a collet 136, and a slide member 134.

Drawbar 132 is provided on the axis of central axis 106. Drawbar 132 is provided so as to be slidable in a front-rear direction in the axial direction of central axis 106. Collet 136 is attached to a front end of drawbar 132. Collet 136 is deformed so as to expand or contract in diameter about central axis 106 as drawbar 132 slides in the front-rear direction in the axial direction of central axis 106.

Drawbar 132 is provided with an insertion hole 132*h*. Insertion hole 132*h* extends on the axis of central axis 106 and opens rearward in the axial direction of central axis 106. Slide member 134 is provided side by side with drawbar 132 in the axial direction of central axis 106. Slide member 134 is inserted into insertion hole 132*h*.

Slide member 134 includes a lever (locking part) 135. Lever 135 has a lever shape extending outward in a radial direction of central axis 106. Slide member 134 includes a plurality of levers 135. Slide member 134 includes three levers 135. The plurality of levers 135 are arranged at intervals in a circumferential direction of central axis 106. The plurality of levers 135 are provided at equal intervals in the circumferential direction of central axis 106 (see FIG. 15 described later).

When an external force directed rearward in the axial direction of central axis 106 is applied to the plurality of levers 135, slide member 134 slides rearward in the axial direction of central axis 106. At this time, drawbar 132 slides rearward in the axial direction of central axis 106 together with slide member 134, and then collet 136 is deformed so as to expand in diameter about central axis 106. A clamped state of the tool is obtained by the tool being gripped by collet 136 and drawn rearward in the axial direction of central axis 106.

When an external force directed forward in the axial direction of central axis 106 is applied to the plurality of levers 135, slide member 134 slides forward in the axial direction of central axis 106. At this time, drawbar 132 slides forward in the axial direction of central axis 106 together with slide member 134, and then collet 136 is deformed so as to contract in diameter about central axis 106. An unclamped state of the tool is obtained by the tool being released from the hold by collet 136 and pushed forward in the axial direction of central axis 106.

Drawbar 132 has a wedge mechanism part 133. When slide member 134 slides rearward in the axial direction of central axis 106 at a time of clamping the tool, a force directed outward in the radial direction of central axis 106 acts on wedge mechanism part 133 from slide member 134, and a wedge effect is generated in wedge mechanism part 133. As a result, when the application of the force rearward in the axial direction of central axis 106 to the plurality of levers 135 is eliminated, the clamped state of the tool is still maintained.

Referring to FIGS. 6 and 8, first tool holder 121A further includes an outer housing (second housing member) 141, an inner housing 143, a first bearing 142, and a rear member 151.

Inner housing 143 has a cylindrical shape centered on central axis 106. Clamping mechanism part 131 is provided inside inner housing 143. Inner housing 143 is provided with a tool insertion hole 145. Tool insertion hole 145 opens forward in the axial direction of central axis 106. Drawbar 132 and collet 136 in clamping mechanism part 131 are disposed in tool insertion hole 145. A rotating tool clamped by clamping mechanism part 131 is inserted into tool insertion hole 145.

Inner housing 143 is provided with a plurality of openings 144. Openings 144 penetrate inner housing 143 in the radial direction of central axis 106. The plurality of openings 144 are provided at phase positions corresponding to the plurality of levers 135 about central axis 106. Each of the plurality of levers 135 extends to outside of inner housing 143 through the plurality of openings 144 (see FIG. 15 described later).

Outer housing 141 has a cylindrical shape centered on central axis 106. Outer housing 141 is provided on an outer circumference of inner housing 143. Outer housing 141 is provided at a position close to a front end of first tool holder 121A in the axial direction of central axis 106. When first tool holder 121A is mounted on cutting tool rest 31, outer housing 141 is fastened to front housing 57 described later and shown in FIGS. 4 and 5.

First bearing 142 is interposed between inner housing 143 and outer housing 141. First bearing 142 is provided at a position close to a front end of first tool holder 121A in the axial direction of central axis 106. Clamping mechanism part 131 is supported by first bearing 142 with inner housing 143 interposed therebetween so as to be rotatable about central axis 106. First bearing 142 is an angular ball bearing.

Rear member 151 is provided at a rear end of first tool holder 121A. Rear member 151 is fastened to inner housing 143. Rear member 151 is provided so as to close an opening of inner housing 143 that opens rearward in the axial direction of central axis 106.

Rear member 151 has a first connecting part 152. First connecting part 152 extends on the axis of central axis 106 and protrudes rearward in the axial direction of central axis 106. First connecting part 152 has a key shape having a rectangular cross section when cut by a plane orthogonal to central axis 106.

First connecting part 152 is provided with a second air flow path 153. Second air flow path 153 extends on the axis of central axis 106 and opens rearward in the axial direction of central axis 106. Second air flow path 153 sequentially extends from first connecting part 152 to inside rear member 151 and inner housing 143, and opens on an inner peripheral surface of inner housing 143 defining tool insertion hole 145.

Referring to FIGS. 7 and 9, second tool holder 121B further includes a housing 171 and a rear member 161.

Outer housing 171 has a cylindrical shape centered on central axis 106. Clamping mechanism part 131 is provided inside housing 171. Housing 171 is provided with a tool insertion hole 175. Tool insertion hole 175 opens forward in the axial direction of central axis 106. Drawbar 132 and collet 136 in clamping mechanism part 131 are disposed in tool insertion hole 175. A fixed tool clamped by clamping mechanism part 131 is inserted into tool insertion hole 175.

Housing 171 is provided with a plurality of openings 174. The plurality of openings 174 are provided in a similar manner to the plurality of openings 144 in inner housing 143 of first tool holder 121A.

Rear member 161 is provided at a rear end of second tool holder 121B. Rear member 161 is fastened to housing 171. Rear member 161 is provided so as to close an opening of housing 171 that opens rearward in the axial direction of central axis 106.

Rear member 161 has a second connecting part 162. Second connecting part 162 extends on the axis of central axis 106 and protrudes rearward in the axial direction of central axis 106. Second connecting part 162 has a pin shape having a circular cross section when cut by a plane orthogonal to central axis 106.

Second connecting part 162 is provided with a third air flow path 163. Third air flow path 163 extends on the axis of central axis 106 and opens rearward in the axial direction of central axis 106. Third air flow path 163 sequentially extends from second connecting part 162 to inside rear member 161 and housing 171, and opens on an inner peripheral surface of housing 171 defining tool insertion hole 175.

Referring to FIGS. 6 to 9, first tool holder 121A and second tool holder 121B have a substantially identical appearance. First tool holder 121A and second tool holder 121B as a whole have an appearance in which a diameter decreases from forward to rearward in the axial direction of central axis 106.

Next, a structure of a holder-mounting part 50 on which tool holder 121 (121A, 121B) is mounted will be described.

Figure 10:
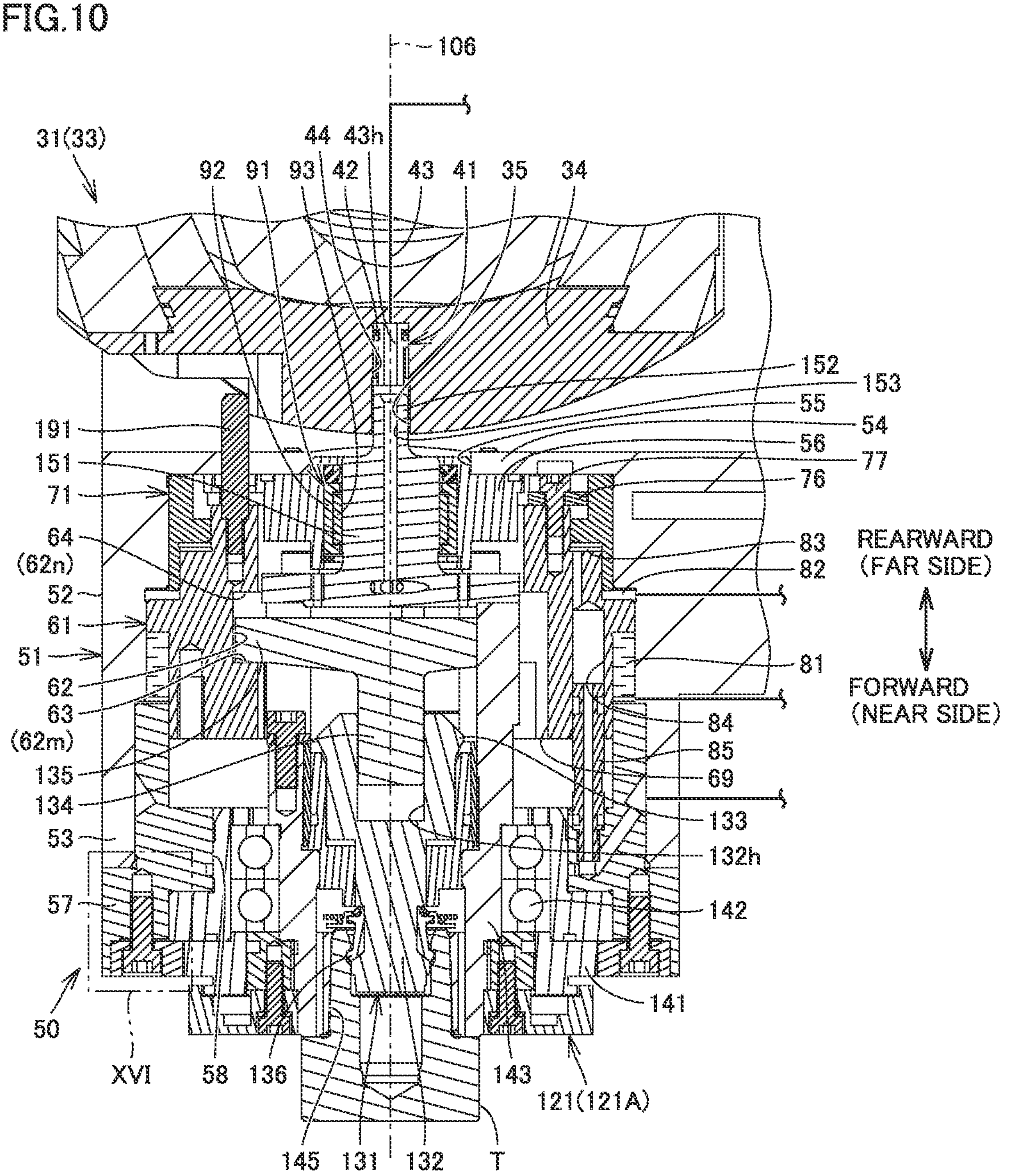
FIG. 10 is a sectional view of the cutting tool rest on which the first tool holder is mounted (at a time of clamping).
Figure 11:
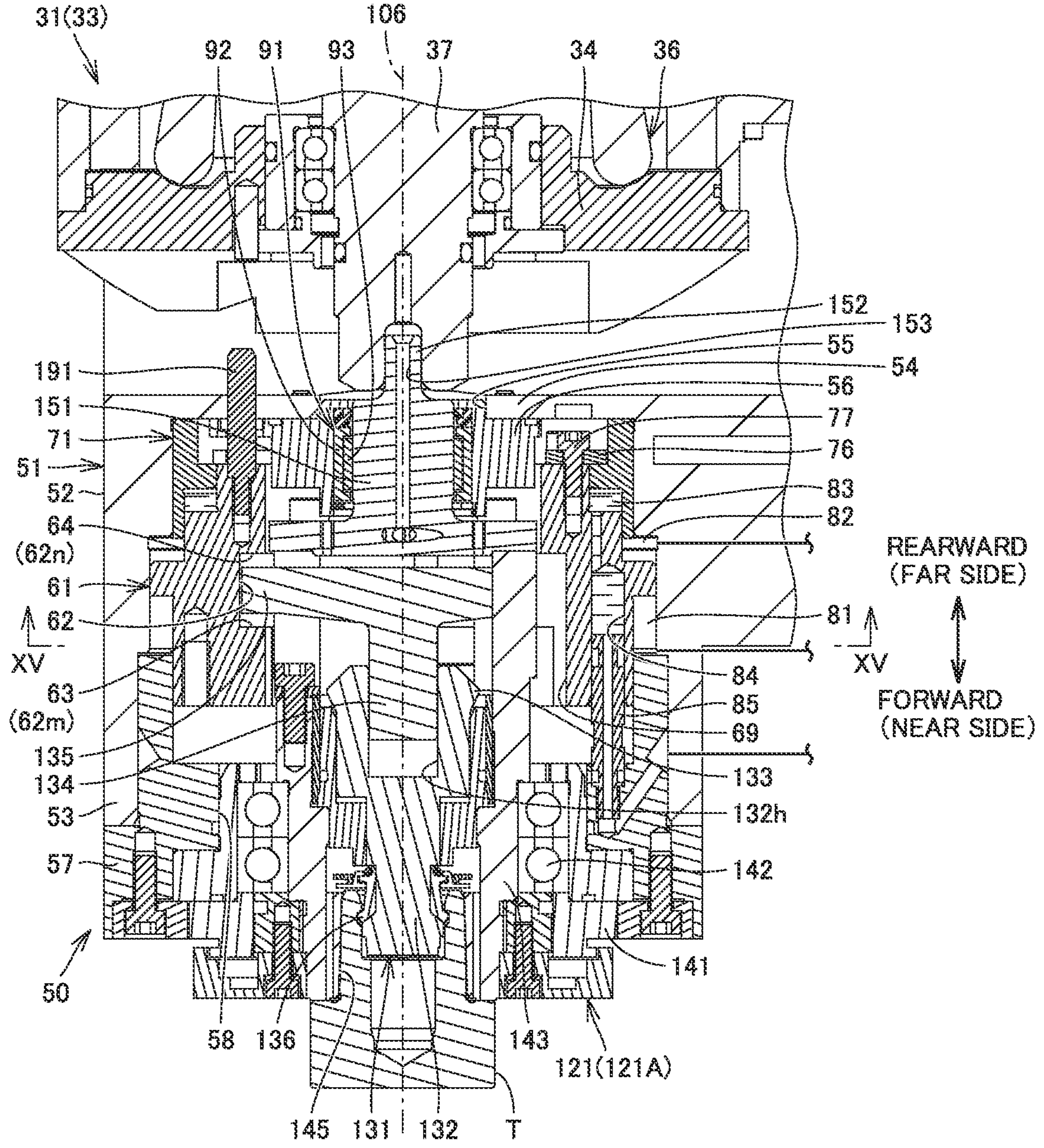
FIG. 11 is a sectional view of the cutting tool rest on which the first tool holder is mounted (at a time of workpiece machining).
Figure 12:
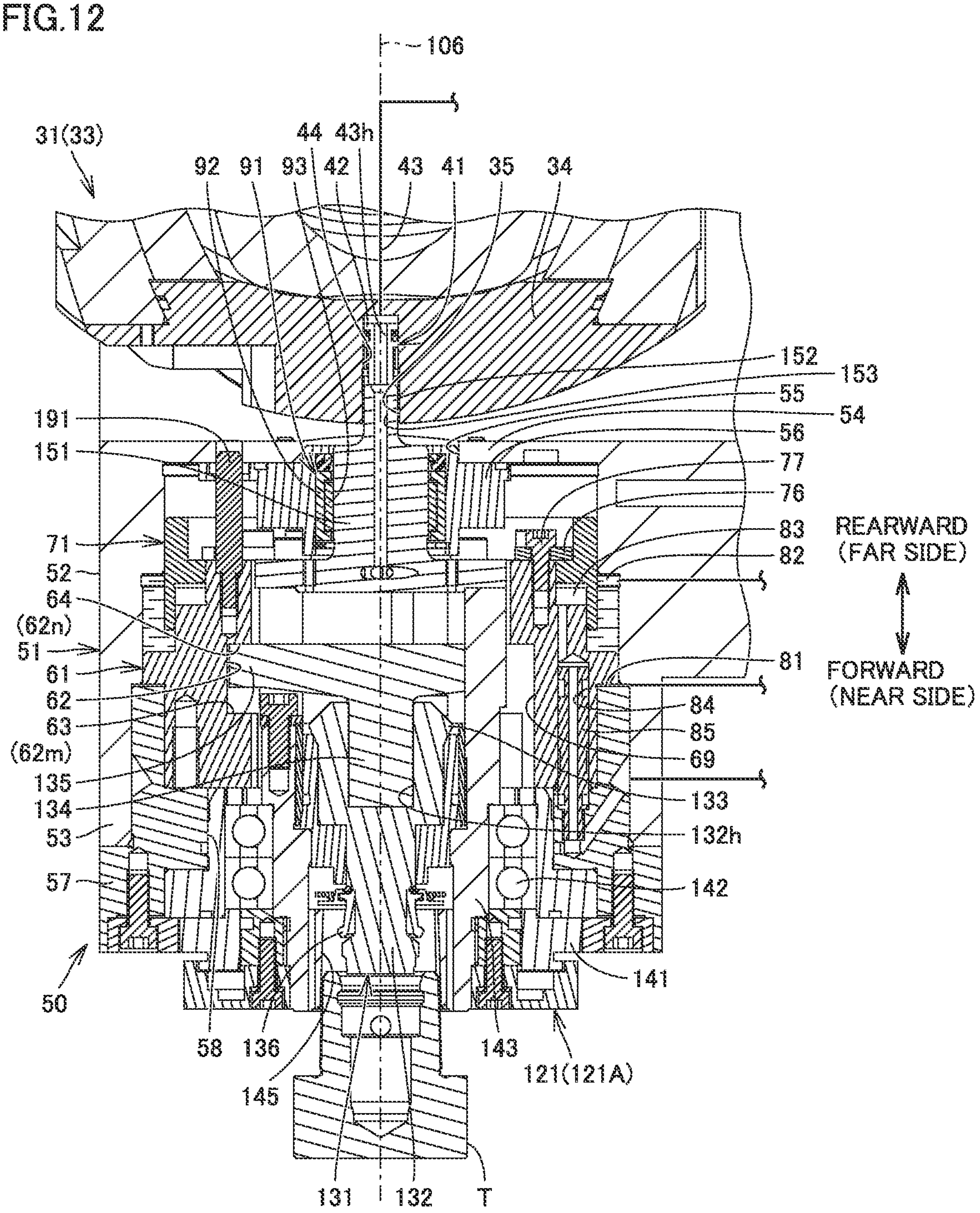
FIG. 12 is a sectional view of the cutting tool rest on which the first tool holder is mounted (at a time of unclamping).

FIG. 10 is a sectional view of the cutting tool rest on which the first tool holder is mounted (at a time of clamping). FIG. 11 is a sectional view of the cutting tool rest on which the first tool holder is mounted (at a time of workpiece machining). FIG. 12 is a sectional view of the cutting tool rest on which the first tool holder is mounted (at a time of unclamping).

FIG. 10 shows a cross section of cutting tool rest 31 at automatic tool change position J in FIG. 2 at the time of clamping the rotating tool. FIG. 11 shows a cross section of cutting tool rest 31 at workpiece machining position K in FIG. 3 at the time of workpiece machining by the rotating tool. FIG. 12 shows a cross section of cutting tool rest 31 at automatic tool change position J in FIG. 2 at the time of unclamping the rotating tool.

Figure 13:
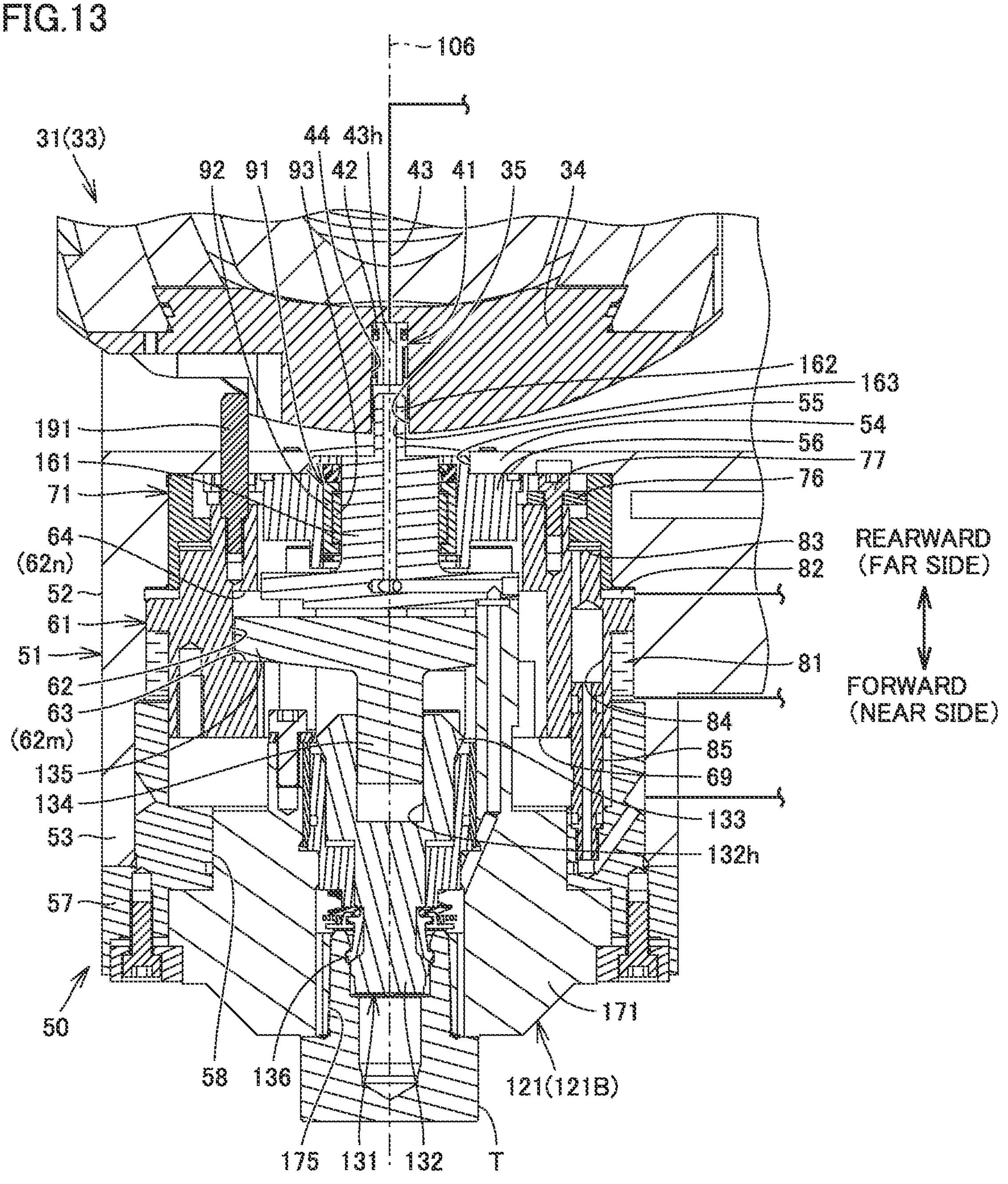
FIG. 13 is a sectional view of the cutting tool rest on which the second tool holder is mounted (at the time of clamping).

FIG. 13 is a sectional view of the cutting tool rest on which the second tool holder is mounted (at the time of clamping). FIG. 13 representatively shows a cross section of cutting tool rest 31 at automatic tool change position J in FIG. 2 at a time of clamping the fixed tool.

Referring to FIGS. 4 and 5 and FIGS. 10 to 13, cutting tool rest 31 further includes a plurality of holder-mounting parts 50.

The plurality of holder-mounting parts 50 are provided on an outer peripheral surface of turret 33. The plurality of holder-mounting parts 50 are provided side by side in the circumferential direction of pivot central axis 102. The plurality of holder-mounting parts 50 have the same structure.

One of first tool holder 121A and second tool holder 121B is selectively mounted on holder-mounting part 50. That is, a user can mount first tool holder 121A that holds the rotating tool or second tool holder 121B that holds the fixed tool on each holder-mounting part 50 in accordance with the contents of the workpiece machining performed by machine tool 10.

Figure 14:
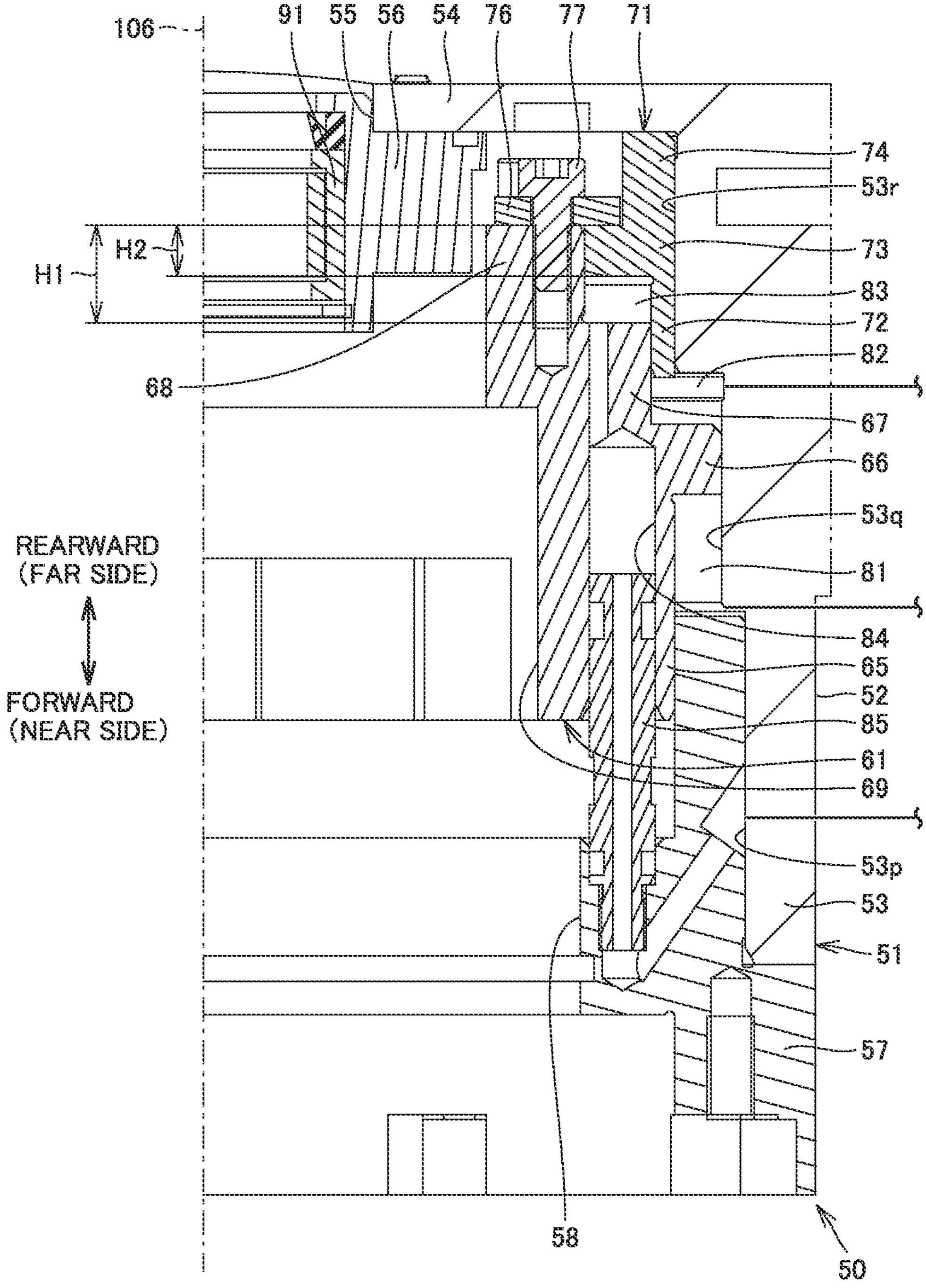
FIG. 14 is an enlarged sectional view of a holder-mounting part in an area surrounded by a two-dot chain line XIV in FIG. 4.

FIG. 14 is an enlarged sectional view of the holder-mounting part in an area surrounded by a two-dot chain line XIV in FIG. 4.

Referring to FIGS. 4 and 14, holder-mounting part 50 includes a cylinder 52, a front housing (first housing member) 57, and a bearing housing 56.

Cylinder 52 includes a cylindrical part 53 and a rear wall 54. Cylindrical part 53 has a cylindrical shape centered on central axis 106.

Cylindrical part 53 has a first inner peripheral surface 53*p*, a second inner peripheral surface 53*q*, and a third inner peripheral surface 53*r*. First inner peripheral surface 53*p*, second inner peripheral surface 53*q*, and third inner peripheral surface 53*r* are arranged in that order from forward to rearward in the axial direction of central axis 106. Second inner peripheral surface 53$q$ has an inner diameter larger than an inner diameter of third inner peripheral surface 53$r$. First inner peripheral surface 53$p$ has an inner diameter larger than the inner diameter of second inner peripheral surface 53$q$.

Rear wall 54 has a wall shape that closes an opening of cylindrical part 53 in the rear in the axial direction of central axis 106. Rear wall 54 is provided with a communication hole 55. Communication hole 55 is a through-hole penetrating rear wall 54 in the axial direction of central axis 106. Communication hole 55 is provided to communicate the inside and the outside of cylindrical part 53.

Front housing 57 is connected to a front end (cylindrical part 53) of cylinder 52. Front housing 57 is fitted to the inside of first inner peripheral surface 53$p$. Bearing housing 56 is connected to a rear end (rear wall 54) of cylinder 52. Bearing housing 56 is fitted to communication hole 55 from the inside of cylindrical part 53.

Holder-mounting part 50 is provided with holder insertion hole 58. Holder insertion hole 58 extends on the axis of central axis 106 and opens forward in the axial direction of central axis 106. Holder insertion hole 58 is provided in front housing 57. Tool holder 121 (first tool holder 121A, second tool holder 121B) mounted on holder-mounting part 50 is inserted into holder insertion hole 58. The direction indicated by arrow 201 in FIG. 4 is the insertion direction of tool holder 121 (first tool holder 121A, second tool holder 121B) into holder insertion hole 58.

Holder-mounting part 50 further includes a second bearing 91. Second bearing 91 is provided at a rear end of holder-mounting part 50. Second bearing 91 is fitted to the inside of bearing housing 56. Second bearing 91 is disposed inside of cylindrical part 53.

Referring to FIGS. 10 to 12, first tool holder 121A that holds the rotating tool is mounted on holder-mounting part 50. Outer housing 141 of first tool holder 121A is fitted to the inside of front housing 57 of holder-mounting part 50.

Rear member 151 is inserted into second bearing 91. Second bearing 91 is disposed on a farther side than first bearing 142 in the insertion direction of first tool holder 121A into holder insertion hole 58. Second bearing 91 is provided to face turret 33 in the axial direction of central axis 106. Second bearing 91 centered on central axis 106 has a diameter D2 that is smaller than a diameter D1 of first bearing 142 centered on central axis 106 (see FIGS. 4 and 8).

Second bearing 91 is a needle bearing. Second bearing 91 includes an outer ring 92 and a plurality of rollers 93.

Outer ring 92 has a cylindrical shape centered on central axis 106. Outer ring 92 is fitted to the inside of bearing housing 56. The plurality of rollers 93 are supported by outer ring 92. Each roller 93 extends axially in the axial direction of central axis 106. The plurality of rollers 93 are arranged at intervals in the circumferential direction of central axis 106. The plurality of rollers 93 are in contact with first tool holder 121A. The plurality of rollers 93 are in contact with an outer peripheral surface of rear member 151.

Second bearing 91 supports first tool holder 121A so as to be rotatable about central axis 106. First tool holder 121A is rotatably supported by first bearing 142 on the near side in the insertion direction of first tool holder 121A into holder insertion hole 58, and is rotatably supported by second bearing 91 on the far side in the insertion direction of first tool holder 121A.

First connecting part 152 moves inside circumferential groove 35 in accordance with a pivot operation of turret 33. In the cross section of cutting tool rest 31 at automatic tool change position J shown in FIGS. 10 and 12, first connecting part 152 is connected to air supply part 41. First connecting part 152 is positioned to face air nozzle 42 in nozzle insertion hole 44. As a result, first air flow path 43 on a side of turret 33 and second air flow path 153 on a side of first tool holder 121A communicate with each other.

At the time of automatic change of the rotating tool held by first tool holder 121A, air from air supply source 46 sequentially flows through first air flow path 43 and second air flow path 153. The air flowing through second air flow path 153 is ejected into a gap between the rotating tool inserted into and removed from tool insertion hole 145 and the inner peripheral surface of inner housing 143 defining tool insertion hole 145.

In the cross section of cutting tool rest 31 at workpiece machining position K shown in FIG. 11, first connecting part 152 is disposed in engagement groove 38 of rotor shaft 37. At this time, first connecting part 152 having a rectangular cross section is engaged with engagement groove 38. As a result, a rotation output from motor 36 is transmitted from rotor shaft 37 to rear member 151, and thus the rotating tool held by first tool holder 121 can be rotated.

Referring to FIG. 13, second tool holder 121B that holds the fixed tool is mounted on holder-mounting part 50. Housing 171 of second tool holder 121B is fitted to the inside of front housing 57 of holder-mounting part 50.

Rear member 161 is inserted into second bearing 91. Second tool holder 121B is supported by front housing 57 on the near side in the insertion direction of second tool holder 121B into holder insertion hole 58, and is supported by second bearing 91 on the far side in the insertion direction of second tool holder 121B.

Second connecting part 162 moves inside circumferential groove 35 in accordance with the pivot operation of turret 33. In the cross section of cutting tool rest 31 at automatic tool change position J shown in FIG. 13, second connecting part 162 is positioned to face air nozzle 42 in nozzle insertion hole 44. As a result, first air flow path 43 on the side of turret 33 and third air flow path 163 on a side of second tool holder 121B communicate with each other.

At the time of automatic change of the fixed tool held by second tool holder 121B, air from air supply source 46 sequentially flows through first air flow path 43 and third air flow path 163. The air flowing through third air flow path 163 is ejected into a gap between the fixed tool inserted into and removed from tool insertion hole 175 and the inner peripheral surface of housing 171 defining tool insertion hole 175.

When second tool holder 121B is positioned at workpiece machining position K, second connecting part 162 is disposed in engagement groove 38 of rotor shaft 37 as in a case where first tool holder 121A is positioned at workpiece machining position K. At this time, second connecting part 162 having a circular cross section is not engaged with engagement groove 38. As a result, even if rotation is output from motor 36, the rotation is not transmitted to second tool holder 121B.

Next, a hydraulic cylinder mechanism part 51 for operating clamping mechanism part 131 will be described.

Referring to FIGS. 10 to 13, holder-mounting part 50 includes a hydraulic cylinder mechanism part 51. When hydraulic pressure is supplied, hydraulic cylinder mechanism part 51 causes clamping mechanism part 131 in tool holder 121 (first tool holder 121A, second tool holder 121B) to operate in a clamped state of clamping a tool and an unclamped state of unclamping the tool.

Referring to FIGS. 4 and 14, hydraulic cylinder mechanism part 51 includes a first piston 61 and a second piston 71 in addition to cylinder 52 described above.

First piston 61 and second piston 71 have a cylindrical shape centered on central axis 106. First piston 61 and second piston 71 are fitted to cylinder 52. First piston 61 and second piston 71 are provided so as to be slidable in the axial direction of central axis 106.

First piston 61 and second piston 71 are provided side by side in the axial direction of central axis 106. Second piston 71 is disposed on a farther side than first piston 61 in the insertion direction of tool holder 121 into holder insertion hole 58.

First piston 61 has a front step 65, a first middle step 66, a second middle step 67, and a rear step 68.

Front step 65, first middle step 66, second middle step 67, and rear step 68 are disposed in that order from the near side to the far side in the insertion direction of tool holder 121 into holder insertion hole 58. Front step 65 is provided at a front end of first piston 61. Rear step 68 is provided at a rear end of first piston 61.

Front step 65, first middle step 66, second middle step 67, and rear step 68 have a stepped shape on an outer peripheral surface of first piston 61. First middle step 66 has the largest outer diameter (diameter) in first piston 61. Front step 65 and second middle step 67 have an outer diameter (diameter) smaller than the outer diameter of first middle step 66. Rear step 68 has an outer diameter (diameter) smaller than the outer diameter of front step 65 and second middle step 67. Rear step 68 has the smallest outer diameter (diameter) in first piston 61.

An outer peripheral surface of first middle step 66 is slidably in contact with second inner peripheral surface 53*q* of cylinder 52. An outer peripheral surface of front step 65 is slidably in contact with an inner peripheral surface of front housing 57.

Second piston 71 has a front step 72, a middle step 73, and a rear step 74. Front step 72, middle step 73, and rear step 74 are disposed in that order from the near side to the far side in the insertion direction of tool holder 121 into holder insertion hole 58. Front step 72 is provided at a front end of second piston 71. Rear step 74 is provided at a rear end of second piston 71.

Front step 72, middle step 73, and rear step 74 have a stepped shape on an inner peripheral surface of second piston 71. Middle step 73 has the smallest inner diameter in second piston 71. Rear step 74 has an inner diameter larger than the inner diameter of middle step 73. Front step 72 has an inner diameter larger than the inner diameter of rear step 74. Front step 72 has the largest inner diameter in second piston 71. Middle step 73 has a protruding shape protruding inward in the radial direction of central axis 106 from rear step 74 and front step 72.

An outer peripheral surface of second piston 71 (front step 72, middle step 73, and rear step 74) is slidably in contact with third inner peripheral surface 53*r* of cylinder 52. An inner peripheral surface of front step 72 is slidably in contact with an outer peripheral surface of second middle step 67 of first piston 61. An inner peripheral surface of middle step 73 is slidably in contact with an outer peripheral surface of rear step 68 of first piston 61.

Holder-mounting part 50 (hydraulic cylinder mechanism part 51) further includes a locking block (locking member) 76. Locking block 76 is provided on first piston 61. Locking block 76 is provided at the rear end (rear step 68) of first piston 61. Locking block 76 is fastened to first piston 61 with a bolt 77. Locking block 76 is provided so as to protrude outward in the radial direction of central axis 106 from the outer peripheral surface of rear step 68. A part of locking block 76 protruding outward in the radial direction of central axis 106 faces second middle step 67 of first piston 61 with a space therebetween in the axial direction of central axis 106.

Middle step 73 of second piston 71 is disposed between the part of locking block 76 protruding outward in the radial direction of central axis 106 and second middle step 67 of first piston 61 in the axial direction of central axis 106.

A distance H1 between locking block 76 and second middle step 67 in the axial direction of central axis 106 is larger than a length H2 of middle step 73 in the axial direction of central axis 106. In this configuration, second piston 71 is slidable against first piston 61 in a range in which middle step 73 moves between locking block 76 and second middle step 67. Locking block 76 is provided as a stopper between first piston 61 and second piston 71.

Cylinder 52 defines a first hydraulic chamber 81 and a second hydraulic chamber 82. First piston 61 and second piston 71 define a third hydraulic chamber 83.

Each of first hydraulic chamber 81, second hydraulic chamber 82, and third hydraulic chamber 83 is connected to a hydraulic supply source 87 via a valve 86. When valve 86 is controlled to open and close, hydraulic pressure from hydraulic supply source 87 is supplied to first hydraulic chamber 81, second hydraulic chamber 82, or third hydraulic chamber 83 (see FIGS. 4 and 5).

First hydraulic chamber 81 is formed between first piston 61 (front step 65) and cylinder 52 (second inner peripheral surface 53*q*) in the radial direction of central axis 106. First hydraulic chamber 81 is formed between front housing 57 and first piston 61 (first middle step 66) in the axial direction of central axis 106. When hydraulic pressure is supplied to first hydraulic chamber 81, first piston 61 slides from the near side to the far side in the insertion direction of tool holder 121 into holder insertion hole 58.

Second hydraulic chamber 82 is formed between first piston 61 (second middle step 67) and cylinder 52 (second inner peripheral surface 53*q*) in the radial direction of central axis 106. Second hydraulic chamber 82 is formed between first piston 61 (first middle step 66), and cylinder 52 (a step between second inner peripheral surface 53*q* and third inner peripheral surface 53*r*) and second piston 71 (front step 72) in the axial direction of central axis 106. First hydraulic chamber 81 and second hydraulic chamber 82 are arranged side by side with first middle step 66 interposed therebetween in the axial direction of central axis 106. When hydraulic pressure is supplied to second hydraulic chamber 82, first piston 61 slides from the far side to the near side in the insertion direction of tool holder 121 into holder insertion hole 58.

Third hydraulic chamber 83 is formed between first piston 61 (rear step 68) and second piston 71 (front step 72) in the radial direction of central axis 106. Third hydraulic chamber 83 is formed between first piston 61 (second middle step 67) and second piston 71 (middle step 73) in the axial direction of central axis 106.

First piston 61 is provided with a plunger insertion hole 84. Plunger insertion hole 84 extends in the axial direction of central axis 106 from an end surface of the front end (front step 65) of first piston 61 and communicates with third hydraulic chamber 83.

Holder-mounting part 50 (hydraulic cylinder mechanism part 51) further includes a plunger 85. Plunger 85 extends in a cylindrical shape in the axial direction of central axis 106. Plunger 85 is inserted into plunger insertion hole 84. Plunger 85 is slidable in plunger insertion hole 84 in the axial direction of central axis 106. Plunger 85 protrudes from plunger insertion hole 84 to the near side in the insertion direction of tool holder 121 into holder insertion hole 58. Plunger 85 is connected to front housing 57.

The hydraulic pressure from hydraulic supply source 87 is supplied to third hydraulic chamber 83 through plunger 85 and plunger insertion hole 84. When hydraulic pressure is supplied to third hydraulic chamber 83, first piston 61 and second piston 71 slide against each other in a direction in which second middle step 67 and middle step 73 are separated from each other.

First hydraulic chamber 81, second hydraulic chamber 82, and third hydraulic chamber 83 are disposed in that order from the near side to the far side in the insertion direction of tool holder 121 into holder insertion hole 58.

Third hydraulic chamber 83 is provided inside in the radial direction of central axis 106 with respect to first hydraulic chamber 81 and second hydraulic chamber 82. An outer peripheral wall of third hydraulic chamber 83 and an inner peripheral wall of second hydraulic chamber 82 are located at the same radial position about central axis 106. The outer peripheral wall of third hydraulic chamber 83 is located inside in the radial direction of central axis 106 with respect to an inner peripheral wall of first hydraulic chamber 81.

Figure 15:
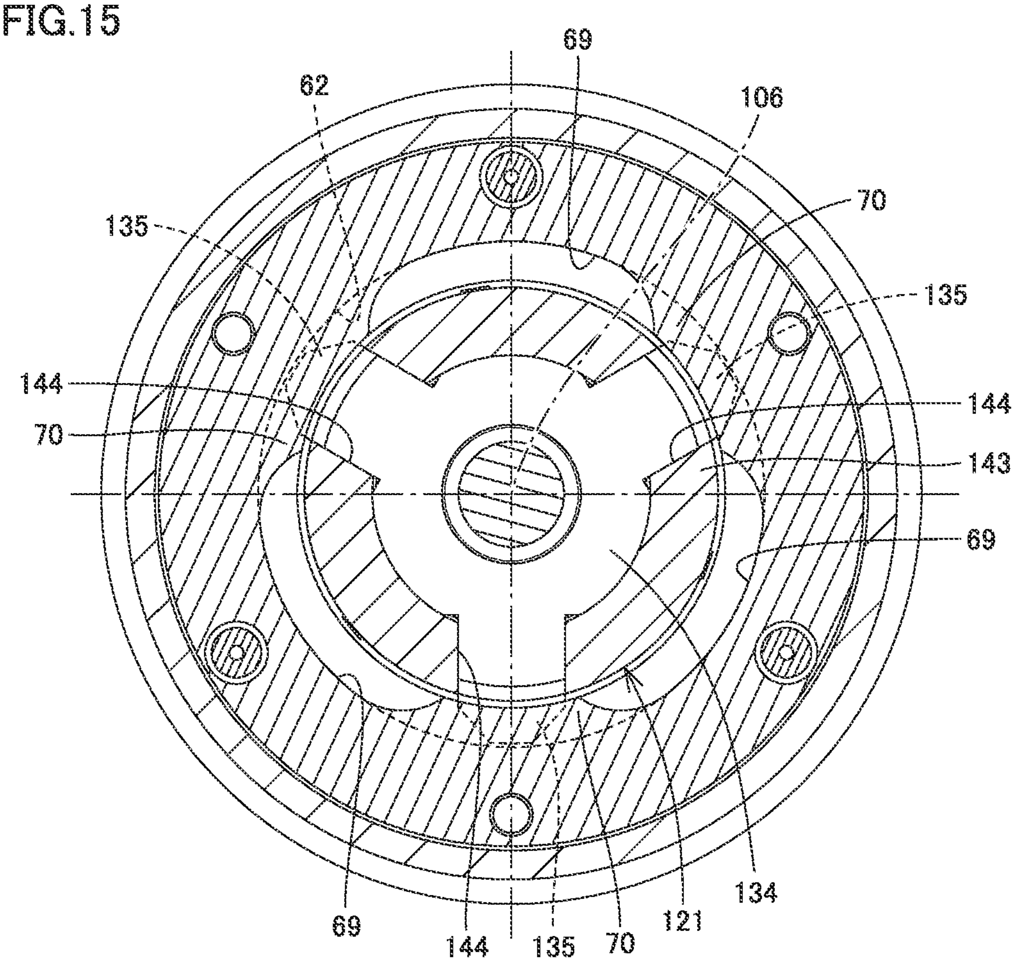
FIG. 15 is a sectional view of the cutting tool rest as viewed in a direction of an arrow on a line XV-XV in FIG. 11.

FIG. 15 is a sectional view of the cutting tool rest as viewed in a direction of an arrow on a line XV-XV in FIG. 11. Referring to FIGS. 11 and 15, first piston 61 includes a first facing section 63 and a second facing section 64.

First facing section 63 and second facing section 64 face each other with a space therebetween in the axial direction of central axis 106. First facing section 63 is disposed on a nearer side than second facing section 64 in the insertion direction of first tool holder 121A into holder insertion hole 58.

First piston 61 is provided on a recess 62. Recess 62 has a recessed shape recessed outward in the radial direction of central axis 106 from an inner peripheral surface of first piston 61. Recess 62 is an annular groove extending in the circumferential direction of central axis 106.

First piston 61 has a first wall surface 62*m* and a second wall surface 62*n*. First wall surface 62*m* and second wall surface 62*n* correspond to a wall surface of recess 62. First wall surface 62*m* and second wall surface 62*n* are planes orthogonal to central axis 106. First wall surface 62*m* faces toward the far side in the insertion direction of first tool holder 121A into holder insertion hole 58. Second wall surface 62*n* faces toward the near side in the insertion direction of first tool holder 121A into holder insertion hole 58. First wall surface 62*m* corresponds to first facing section 63. Second wall surface 62*n* corresponds to second facing section 64.

The plurality of levers 135 are disposed between first facing section 63 (first wall surface 62*m*) and second facing section 64 (second wall surface 62*n*). A distance between first facing section 63 (first wall surface 62*m*) and second facing section 64 (second wall surface 62*n*) in the axial direction of central axis 106 is larger than a length (thickness) of lever 135 in the axial direction of central axis 106.

Referring to FIGS. 10 to 12 and 14, first piston 61 reciprocates between a first position (a position shown in FIG. 10) at which lever 135 and first facing section 63 (first wall surface 62*m*) are in contact with each other to operate clamping mechanism part 131 in a clamped state of clamping the rotating tool and a second position (a position shown in FIG. 12) at which lever 135 and second facing section 64 (second wall surface 62*n*) are in contact with each other to operate clamping mechanism part 131 in an unclamped state of unclamping the rotating tool.

Second piston 71 moves first piston 61 to a third position (position shown in FIG. 11) located between the first position (position shown in FIG. 10) and the second position (position shown in FIG. 12) in the axial direction of central axis 106. When first piston 61 is positioned at the third position (position shown in FIG. 11), clamping mechanism part 131 is held in the clamped state, and lever 135 is separated from first facing section 63 (first wall surface 62*m*) and second facing section 64 (second wall surface 62*n*).

Specifically, when the rotating tool is mounted on first tool holder 121A, clamping mechanism part 131 is operated from the unclamped state to the clamped state. In this case, as shown in FIG. 10, the hydraulic supply from hydraulic supply source 87 to second hydraulic chamber 82 is stopped, and the hydraulic pressure is supplied from hydraulic supply source 87 to first hydraulic chamber 81. When the hydraulic pressure is supplied to first hydraulic chamber 81, first piston 61 slides rearward in the axial direction of central axis 106.

As a result, first piston 61 moves to a slide end in the rear in the axial direction of central axis 106 where bolt 77 abuts on rear wall 54 of cylinder 52. Second piston 71 also moves with first piston 61 to a slide end in the rear in the axial direction of central axis 106 where rear step 74 abuts on rear wall 54 of cylinder 52. Locking block 76 and middle step 73 of second piston 71 are separated from each other in the axial direction of central axis 106.

As first piston 61 slides, first facing section 63 (first wall surface 62*m*) comes into contact with the plurality of levers 135. First facing section 63 (first wall surface 62*m*) pushes the plurality of levers 135 rearward in the axial direction of central axis 106, and thus an external force rearward in the axial direction of central axis 106 is applied to the plurality of levers 135. As a result, a clamped state in which clamping mechanism part 131 clamps the rotating tool is obtained.

After the clamped state of clamping the rotating tool is obtained, as shown in FIG. 11, the hydraulic pressure supply from hydraulic supply source 87 to first hydraulic chamber 81 is stopped, and the hydraulic pressure is supplied from hydraulic supply source 87 to third hydraulic chamber 83. When the hydraulic pressure is supplied to third hydraulic chamber 83, first piston 61 slides forward in the axial direction of central axis 106.

As a result, first piston 61 moves to a position where locking block 76 abuts on middle step 73 of second piston 71. Second piston 71 is stopped at the slide end in the rear in the axial direction of central axis 106 where rear step 74 abuts on rear wall 54 of cylinder 52.

As first piston 61 slides, first facing section 63 (first wall surface 62*m*) is separated from lever 135. Lever 135 is not in contact with first facing section 63 (first wall surface 62*m*) and second facing section 64 (second wall surface 62*n*). That is, a moving length of first piston 61 in this process is smaller than a length of a gap between lever 135 and second facing section 64 (second wall surface 62*n*) in the axial direction of central axis 106 shown in FIG. 10.

Clamping mechanism part 131 maintains the clamped state of the rotating tool by the wedge effect in wedge mechanism part 133 described above. The workpiece is subjected to milling while the rotating tool held by first tool holder 121A is rotated. At this time, the rotating tool can be rotated without bringing the plurality of levers 135 into contact with first facing section 63 (first wall surface 62*m*) and second facing section 64 (second wall surface 62*n*).

When the rotating tool is removed from first tool holder 121A, clamping mechanism part 131 is operated in the unclamped state. In this case, as shown in FIG. 12, the hydraulic pressure supply from hydraulic supply source 87 to third hydraulic chamber 83 is stopped, and the hydraulic pressure is supplied to second hydraulic chamber 82. When the hydraulic pressure is supplied to second hydraulic chamber 82, first piston 61 slides forward in the axial direction of central axis 106.

As a result, first piston 61 moves to the slide end at the front in the axial direction of central axis 106 where front step 65 abuts on outer housing 141 and front housing 57. Locking block 76 is locked to second piston 71 (middle step 73), and thus second piston 71 also moves integrally with first piston 61.

As first piston 61 slides, second facing section 64 (second wall surface 62*n*) comes into contact with the plurality of levers 135. Second facing section 64 (second wall surface 62*n*) pushes the plurality of levers 135 forward in the axial direction of central axis 106, and thus an external force forward in the axial direction of central axis 106 is applied to the plurality of levers 135. As a result, an unclamped state in which clamping mechanism part 131 unclamps the rotating tool is obtained.

Note that, although the operation of clamping mechanism part 131 when first tool holder 121A is mounted on holder-mounting part 50 has been described above, the same applies to the operation of clamping mechanism part 131 when second tool holder 121B is mounted on holder-mounting part 50.

Next, a structure of holder-mounting part 50 on which tool holder 121 (121A, 121B) is mounted will be described.

Figure 16:
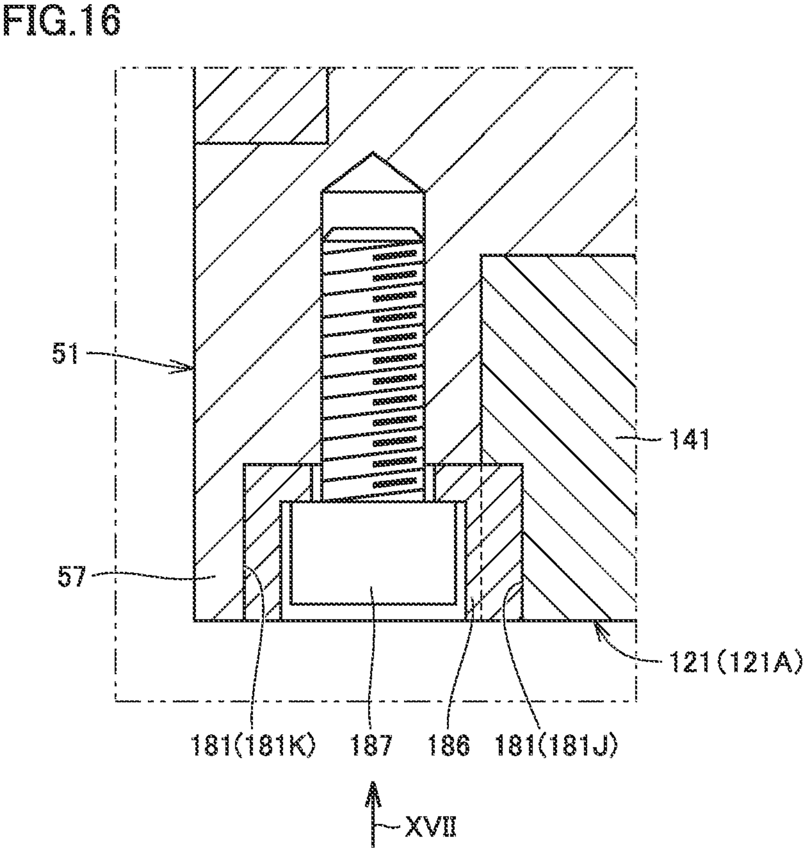
FIG. 16 is an enlarged sectional view of the cutting tool rest in an area surrounded by a two-dot chain line XVI in FIG. 10.
Figure 17:
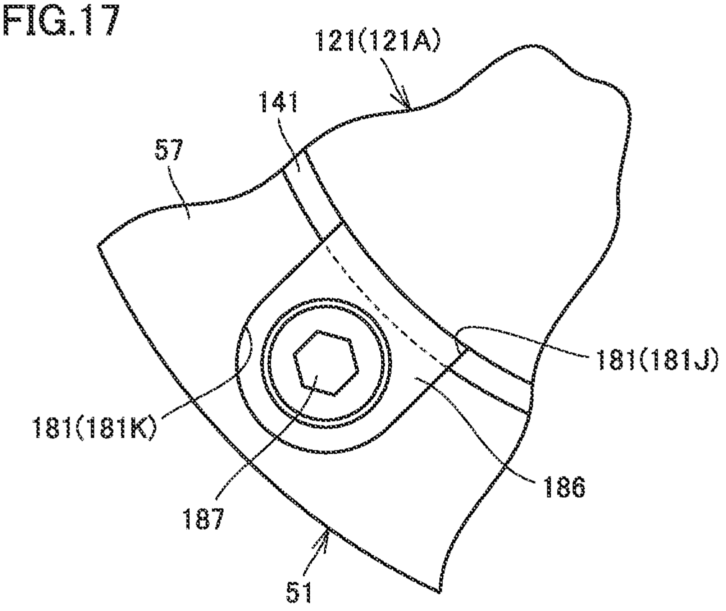
FIG. 17 is a view of the cutting tool rest as viewed in a direction indicated by XVII in FIG. 16.

FIG. 16 is an enlarged sectional view of the cutting tool rest in an area surrounded by a two-dot chain line XVI in FIG. 10. FIG. 17 is a view of the cutting tool rest as viewed in a direction indicated by XVII in FIG. 16.

Referring to FIGS. 16 and 17, outer housing 141 of first tool holder 121A and front housing 57 of holder-mounting part 50 are provided with a plurality of recessed parts 181 (181J, 181K). The plurality of recessed parts 181 are arranged at intervals in the circumferential direction of central axis 106.

Recessed parts 181 are provided across outer housing 141 and front housing 57. Recessed parts 181 have a recessed shape recessed from the near side toward the far side in the insertion direction of first tool holder 121A. Outer housing 141 is provided with recessed part 181J. Front housing 57 is provided with recessed part 181K. Recessed part 181J and recessed part 181K are connected to each other in the radial direction of central axis 106 to form recessed part 181.

Cutting tool rest 31 further includes a plurality of block members 186. The plurality of block members 186 are fitted into the plurality of recessed parts 181, respectively. An end surface of block member 186 is flush with end surfaces of outer housing 141 and front housing 57 in the axial direction of central axis 106. Block member 186 is fastened to front housing 57 with a bolt 187.

A fastening structure between holder-mounting part 50 and second tool holder 121B is similar to a fastening structure between holder-mounting part 50 and first tool holder 121A. As illustrated in FIG. 7, in second tool holder 121B, recessed part 181J constituting recessed part 181 is provided in housing 171.

Figure 18:
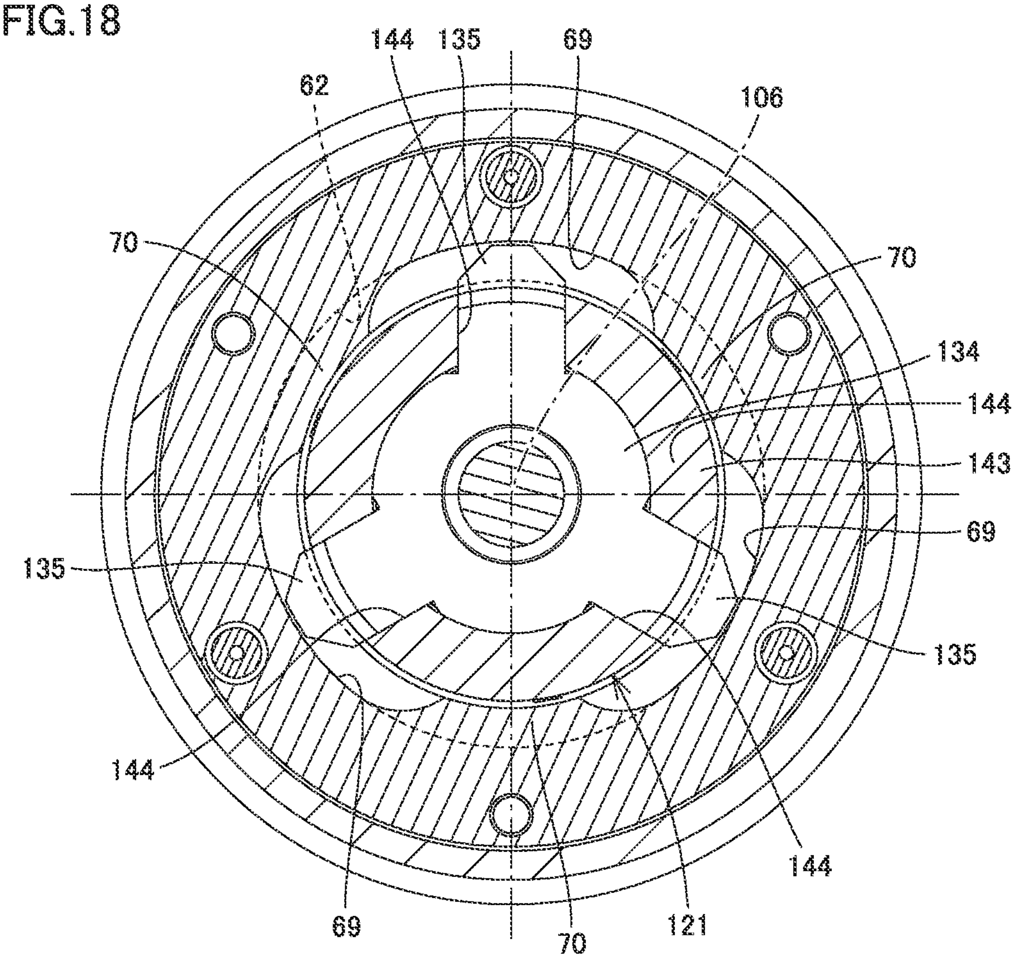
FIG. 18 is a sectional view illustrating a process of attaching and detaching the first tool holder to and from the holder-mounting part in the cutting tool rest shown in FIG. 15.

FIG. 18 is a sectional view illustrating a process of attaching and detaching the first tool holder to and from the holder-mounting part in the cutting tool rest shown in FIG. 15.

Referring to FIGS. 12, 15, and 18, first piston 61 is further provided with a plurality of notches 69. Notches 69 extend from recess 62 in the axial direction of central axis 106 and are opened. Notches 69 open forward in the axial direction of central axis 106. Notches 69 are connected to a bottom wall of recess 62 in the rear in the axial direction of central axis 106.

The plurality of notches 69 are arranged at intervals in the circumferential direction of central axis 106. The plurality of notches 69 are arranged at the same pitch as the plurality of levers 135 in the circumferential direction of central axis 106. A wall 70 having first facing section 63 (first wall surface 62*m*) is provided between notches 69 adjacent to each other in the circumferential direction of central axis 106.

When first tool holder 121A is removed from holder-mounting part 50, first, bolt 187 and block member 186 (see FIGS. 16 and 17) that fasten holder-mounting part 50 and first tool holder 121A are removed. Next, the hydraulic pressure supply from hydraulic supply source 87 is turned off. Subsequently, in order to make first tool holder 121A rotatable in the circumferential direction of central axis 106, first tool holder 121A is pulled out by a predetermined stroke to the near side in the axial direction of central axis 106.

Next, first tool holder 121A is rotated by 60 degrees about central axis 106. As a result, lever 135 is moved from a position facing wall 70 in the axial direction of central axis 106 to a position facing notch 69. Thereafter, by pulling out first tool holder 121A to the near side in the axial direction of central axis 106, the removal of first tool holder 121A is completed.

When first tool holder 121A is mounted on holder-mounting part 50, the above process is to be performed in reverse order. Attachment and detachment of second tool holder 121B to and from holder mounting part 50 are similar to attachment and detachment of first tool holder 121A to and from holder-mounting part 50.

In the present embodiment, since hydraulic cylinder mechanism part 51 is provided not on the side of tool holder 121 but on the side of holder-mounting part 50, when tool holder 121 is removed from holder-mounting part 50, hydraulic cylinder mechanism part 51 still remains in holder-mounting part 50. As a result, a hydraulic path in hydraulic cylinder mechanism part 51 is not interrupted between holder-mounting part 50 and tool holder 121 at a time of change of tool holder 121, and thus workability at the time of change of tool holder 121 can be improved.

In the present embodiment, tool holder 121 on which the tool is mounted so as to extend outward in the radial direction of pivot central axis 102 of cutting tool rest 31 has been described, but is not limited thereto. Tool holder 121 may be a tool holder on which the tool is mounted so as to extend in the axial direction of pivot central axis 102 of cutting tool rest 31.

Hereinafter, configurations and operational effects of cutting tool rest 31 and machine tool 10 according to the present embodiment will be summarized.

Cutting tool rest 31 according to the present embodiment is a tool clamp device on which a rotating tool is detachably mounted. Cutting tool rest 31 includes clamping mechanism part 131 and first piston 61 that reciprocates in the axial direction of central axis 106 as the predetermined axis about central axis 106. Clamping mechanism part 131 includes lever 135 as the locking part disposed between first facing section 63 and second facing section 64. First piston 61 includes first facing section 63 and second facing section 64 that face each other in the axial direction of central axis 106.

First piston 61 reciprocates between a first position at which lever 135 and first facing section 63 are in contact with each other to operate clamping mechanism part 131 in the clamped state of clamping a rotating tool and a second position at which lever 135 and second facing section 64 are in contact with each other to operate clamping mechanism part 131 in the unclamped state of unclamping the rotating tool. Cutting tool rest 31 further includes second piston 71 that moves first piston 61 to the third position located between the first position and the second position in the axial direction of central axis 106. When first piston 61 is positioned at the third position, clamping mechanism part 131 is held in the clamped state, and lever 135 is separated from first facing section 63 and second facing section 64.

In this configuration, by moving first piston 61 to the third position by second piston 71, the clamped rotating tool can be rotated without bringing lever 135 into contact with first facing section 63 and second facing section 64.

Clamping mechanism part 131 preferably has lever 135 extending outward in the radial direction of central axis 106 and corresponding to the locking part. First piston 61 is provided with recess 62 that is recessed outward in the radial direction of central axis 106. Lever 135 is disposed in recess 62. First piston 61 has first wall surface 62*m* and second wall surface 62*n* that constitute the wall surface of recess 62 and correspond to first facing section 63 and second facing section 64, respectively.

In this configuration, by moving first piston 61 to the third position by second piston 71, the clamped rotating tool can be rotated without bringing lever 135 into contact with first wall surface 62*m* and second wall surface 62*n*.

Cutting tool rest 31 preferably further includes cylinder 52 to which first piston 61 and second piston 71 are fitted, the cylinder defining first hydraulic chamber 81 to which hydraulic pressure is supplied when first piston 61 is moved to the first position and second hydraulic chamber 82 to which hydraulic pressure is supplied when first piston 61 is moved to the second position. First piston 61 and second piston 71 define third hydraulic chamber 83 to which hydraulic pressure is supplied to move first piston 61 to the third position. Third hydraulic chamber 83 is provided inside in the radial direction of central axis 106 with respect to first hydraulic chamber 81 and second hydraulic chamber 82.

In this configuration, third hydraulic chamber 83 is provided inside in the radial direction of central axis 106 with respect to first hydraulic chamber 81 and second hydraulic chamber 82, and thus a diameter of second piston 71 defining third hydraulic chamber 83 together with first piston 61 can be set to be smaller than a diameter of first piston 61 operated by the hydraulic pressure supplied to first hydraulic chamber 81 and second hydraulic chamber 82. It is therefore possible to suppress an increase in a size of cutting tool rest 31 in the radial direction of central axis 106 due to the addition of second piston 71.

Cutting tool rest 31 preferably further includes locking block 76 as the locking member that is provided on first piston 61 and holds first piston 61 at the third position by being locked to second piston 71 when hydraulic pressure is supplied to third hydraulic chamber 83.

In this configuration, when hydraulic pressure is supplied to third hydraulic chamber 83, first piston 61 can be held at the third position against the hydraulic pressure.

When the hydraulic pressure is supplied to second hydraulic chamber 82, second piston 71 preferably moves integrally with first piston 61 by locking block 76 being locked to second piston 71.

In this configuration, when the hydraulic pressure is supplied to first hydraulic chamber 81, second piston 71 moves integrally with first piston 61, and thus a locking margin between first piston 61 and second piston 71 in the axial direction of central axis 106 can be set to be short. This configuration can reduce the size of cutting tool rest 31 in the axial direction of central axis 106.

The machine tool according to the present invention includes cutting tool rest 31 and automatic tool changer 18 that changes the rotating tool mounted on cutting tool rest 31.

In this configuration, the clamped rotating tool can be rotated without bringing lever 135 into contact with first facing section 63 and second facing section 64 in cutting tool rest 31 in which the rotating tool can be automatically changed by automatic tool changer 18.

In the present embodiment, the configuration has been described in which the clamping mechanism part has the locking part and the first piston has the first facing section and the second facing section. Alternatively, the clamping mechanism part may have the first facing section and the second facing section, and the first piston may have the locking part. The tool clamp device according to the present invention is not limited to the cutting tool rest, but may be applied to, for example, a tool spindle in a machining center or a complex processing machine.

It should be understood that the embodiment disclosed herein is illustrative in all respects and not restrictive. The scope of the present invention is defined not by the above description but by the claims, and is intended to include meanings equivalent to the claims and all modifications within the claims.

INDUSTRIAL APPLICABILITY

The present invention is applied to, for example, a cutting tool rest mounted on a machine tool and the machine tool.

REFERENCE SIGNS LIST

10: machine tool, 11: bed, 16: saddle, 18: automatic tool changer, 21: headstock, 31: cutting tool rest, 32: cutting tool rest base, 33: turret, 34: ring member, 35: circumferential groove, 36: motor, 37: rotor shaft, 38: engagement groove, 41: air supply part, 42: air nozzle, 43: first air flow path, 43*h*: through-hole, 44: nozzle insertion hole, 46: air supply source, 50: holder-mounting part, 51: hydraulic cylinder mechanism part, 52: cylinder, 53: cylindrical part, 53*p*: first inner peripheral surface, 53*q*: second inner peripheral surface, 53*r*: third inner peripheral surface, 54: rear wall, 55: communication hole, 56: bearing housing, 57: front housing, 58: holder insertion hole, 61: first piston, 62: recess, 62*m*: first wall surface, 62*n*: second wall surface, 63: first facing section, 64: second facing section, 65, 72: front step, 66: first middle step, 67: second middle step, 68, 74: rear step, 70: wall, 71: second piston, 73: middle step, 76: locking block, 77, 187: bolt, 81: first hydraulic chamber, 82: second hydraulic chamber, 83: third hydraulic chamber, 84: plunger insertion hole, 85: plunger, 86: valve, 87: hydraulic supply source, 91: second bearing, 92: outer ring, 93: roller, 101, 106: central axis, 102: pivot central axis, 121: tool holder, 121A: first tool holder, 121B: second tool holder, 131: clamping mechanism part, 132: drawbar, 132*h*: insertion hole, 133: wedge mechanism part, 134: slide member, 135: lever, 136: collet, 141: outer housing,

142: first bearing, 143: inner housing, 144, 174: opening, 145, 175: tool insertion hole, 151, 161: rear member, 152: first connecting part, 153: second air flow path, 162: second connecting part, 163: third air flow path, 171: housing, 181, 181J, 181K: recessed part, 186: block member

The invention claimed is:

1. A tool clamp device on which a rotating tool is detachably mounted, the tool clamp device comprising:

a tool holder that holds the rotating tool, the tool holder including a clamping mechanism part; and a first piston that reciprocates in an axial direction of a predetermined axis about the predetermined axis, the first piston having substantially a cylindrical tube shape having a hollow inside, the first piston including an inner surface, the tool holder being at least partially inserted in the first piston;

the first piston including clamping mechanism part includes one of a first facing section and a second facing section that face each other in the axial direction of the predetermined axis, the first and the second facing sections being configured on the inner surface, the clamping mechanism including the locking part protruding in a radial direction of the predetermined axis, the locking part being configured between the first and second facing sections at the tool holder, the first piston, in a state in which the first piston is configured outside with respect to the tool holder in the radial direction of the predetermined axis, reciprocating between a first position at which the locking part and the first facing section are in contact with each other and the clamping mechanism part is operated in a clamped state of clamping a rotating tool, and a second position at which the locking part and the second facing section are in contact with each other and the clamping mechanism part is operated in an unclamped state of unclamping the rotating tool, the tool clamp device further comprising a second piston that moves the first piston to a third position located between the first position and the second position in the axial direction of the predetermined axis, when the first piston is positioned at the third position, the clamping mechanism part being held in the clamped state, and the locking part being separated from the first facing section and the second facing section.

2. The tool clamp device according to claim 1, wherein the clamping mechanism part includes a lever extending outward in the radial direction of the predetermined axis and corresponding to the locking part, the first piston is provided with a recess that has a recessed shape recessed outward in the radial direction of the predetermined axis, and the lever is disposed in the recess, and the first piston has a first wall surface and a second wall surface that constitute a wall surface of the recess and correspond to the first facing section and the second facing section, respectively.

3. The tool clamp device according to claim 1, further comprising a cylinder to which the first piston and the second piston are fitted, the cylinder defining a first hydraulic chamber to which hydraulic pressure is supplied when the first piston is moved to the first position and a second hydraulic chamber to which hydraulic pressure is supplied when the first piston is moved to the second position, wherein the first piston and the second piston define a third hydraulic chamber to which hydraulic pressure is supplied to move the first piston to the third position, and the third hydraulic chamber is provided inside in the radial direction of the predetermined axis with respect to the first hydraulic chamber and the second hydraulic chamber.

4. A tool clamp device on which a rotating tool is detachably mounted, the tool clamp device comprising:

a clamping mechanism part; and a first piston that reciprocates in an axial direction of a predetermined axis about the predetermined axis, wherein the clamping mechanism part includes one of a first facing section and a second facing section that face each other in the axial direction of the predetermined axis, and a locking part disposed between the first facing section and the second facing section, the first piston includes the other of the first facing section and the second facing section, and the locking part, the first piston reciprocates between a first position at which the locking part and the first facing section are in contact with each other and the clamping mechanism part is operated in a clamped state of clamping a rotating tool, and a second position at which the locking part and the second facing section are in contact with each other and the clamping mechanism part is operated in an unclamped state of unclamping the rotating tool, the tool clamp device further comprising a second piston that moves the first piston to a third position located between the first position and the second position in the axial direction of the predetermined axis, wherein when the first piston is positioned at the third position, the clamping mechanism part is held in the clamped state, and the locking part is separated from the first facing section and the second facing section the tool clamp device further comprising a locking member that is provided on the first piston and holds the first piston at the third position by being locked to the second piston when hydraulic pressure is supplied to the third hydraulic chamber.

5. The tool clamp device according to claim 4, wherein when hydraulic pressure is supplied to the second hydraulic chamber, the second piston moves integrally with the first piston by the locking member being locked to the second piston.

6. A machine tool comprising:

the tool clamp device according to claim 1; and an automatic tool changer that changes a rotating tool mounted on the tool clamp device.

* * * * *